US012573403B2

(12) United States Patent
Chechik et al.

(10) Patent No.: US 12,573,403 B2
(45) Date of Patent: Mar. 10, 2026

(54) SCENE-AWARE SPEECH RECOGNITION USING VISION-LANGUAGE MODELS

(71) Applicant: NVIDIA Corp., Santa Clara, CA (US)

(72) Inventors: Gal Chechik, Ramat Hasharon (IL);
Shie Mannor, Haifa (IL)

(73) Assignee: NVIDIA Corp., Santa Clara, CA (US)

( * ) Notice: Subject to any disclaimer, the term of this patent is extended or adjusted under 35 U.S.C. 154(b) by 356 days.

(21) Appl. No.: 18/339,670

(22) Filed: Jun. 22, 2023

(65) Prior Publication Data

US 2024/0161749 A1    May 16, 2024

Related U.S. Application Data

(60) Provisional application No. 63/383,421, filed on Nov. 11, 2022.

(51) Int. Cl.
G10L 15/26        (2006.01)
G06V 10/774      (2022.01)
G10L 15/22        (2006.01)

(52) U.S. Cl.
CPC ............ G10L 15/26 (2013.01); G06V 10/774 (2022.01); G10L 15/22 (2013.01); *G10L 2015/223* (2013.01)

(58) Field of Classification Search
None
See application file for complete search history.

(56) References Cited

U.S. PATENT DOCUMENTS

| | | | | | |
|---|---|---|---|---|---|
| 8,949,125 | B1 * | 2/2015 | Chechik | ................. | G10L 13/02 |
| | | | | | 704/235 |
| 11,739,641 | B1 * | 8/2023 | Roy | ...................... | G06F 40/289 |
| | | | | | 704/257 |
| 12,315,496 | B2 * | 5/2025 | Mittal | ................... | G06N 5/022 |
| 12,394,430 | B2 * | 8/2025 | Park | ........................ | G06N 3/04 |
| 2011/0257971 | A1 * | 10/2011 | Morrison | ............ | G06V 30/142 |
| | | | | | 704/235 |
| 2013/0006623 | A1 * | 1/2013 | Chelba | .................. | G10L 15/187 |
| | | | | | 704/E15.045 |
| 2018/0330730 | A1 * | 11/2018 | Garg | ................... | G10L 15/1815 |
| 2022/0310076 | A1 * | 9/2022 | Kumar | ................ | G10L 15/1822 |
| 2022/0392439 | A1 * | 12/2022 | Siohan | .................... | G10L 15/30 |
| 2023/0106716 | A1 * | 4/2023 | Xiong | ................. | G06V 10/811 |
| | | | | | 704/9 |
| 2023/0140369 | A1 * | 5/2023 | Aminian | ............... | G06F 16/739 |
| | | | | | 382/103 |
| 2023/0230198 | A1 * | 7/2023 | Zhang | ..................... | G06N 3/08 |
| | | | | | 382/276 |
| 2024/0212690 | A1 * | 6/2024 | Ma | ......................... | G10L 17/04 |

OTHER PUBLICATIONS

Hannun Sequence Modeling With CTC DOI 10.23915/distill.00008 entire document Nov. 27, 2017.

* cited by examiner

*Primary Examiner* — Neeraj Sharma
(74) *Attorney, Agent, or Firm* — Carnelian Law, LLC

(57) ABSTRACT

A system to generate a latent space model of a scene or video and apply this latent space and candidate sentences formed from digital audio to a vision-language matching model to enhance the accuracy of speech-to-text conversion. A latent space embedding of the scene is generated in which similar features are represented in the space closer to one another. An embedding for the digital audio is also generated. The vision-language matching model utilizes the latent space embedding to enhance the accuracy of transcribing/interpreting the embedding of the digital audio.

20 Claims, 15 Drawing Sheets

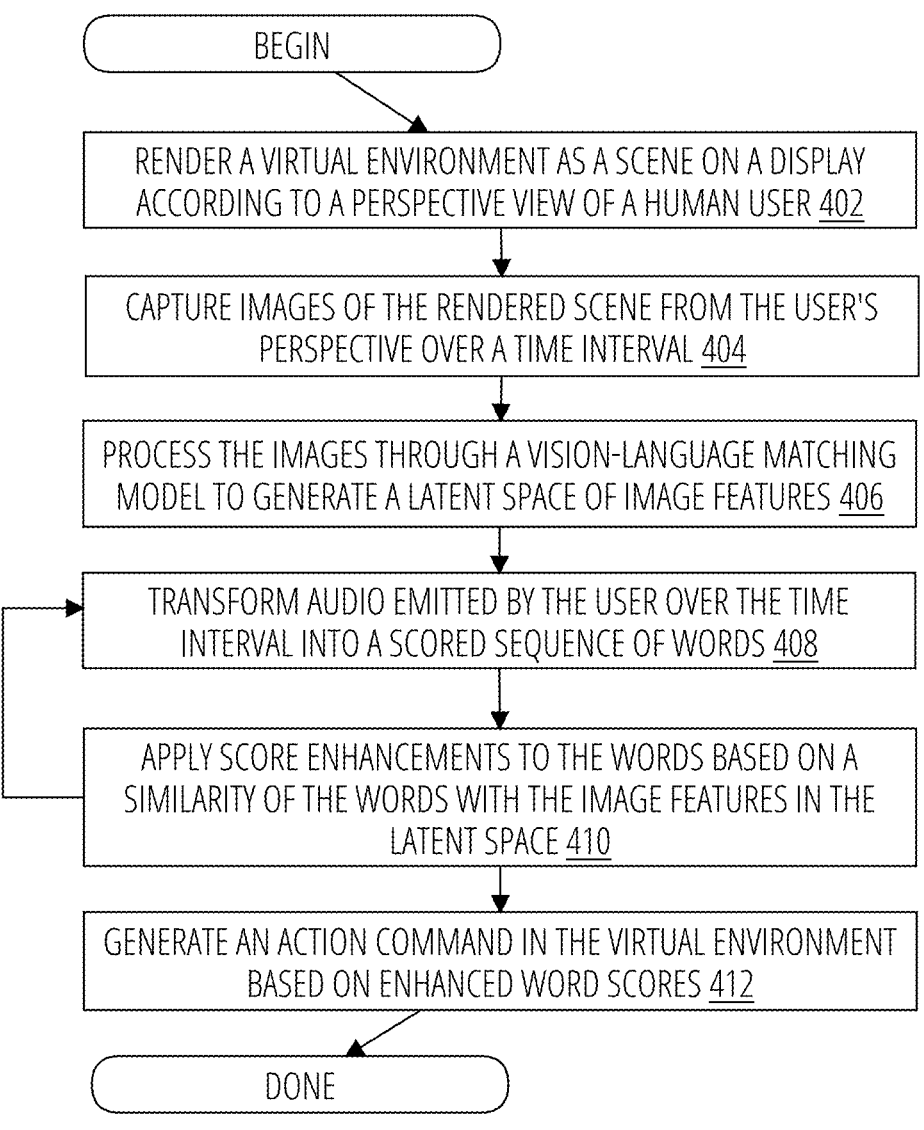

BEGIN

RENDER A VIRTUAL ENVIRONMENT AS A SCENE ON A DISPLAY ACCORDING TO A PERSPECTIVE VIEW OF A HUMAN USER 402

CAPTURE IMAGES OF THE RENDERED SCENE FROM THE USER'S PERSPECTIVE OVER A TIME INTERVAL 404

PROCESS THE IMAGES THROUGH A VISION-LANGUAGE MATCHING MODEL TO GENERATE A LATENT SPACE OF IMAGE FEATURES 406

TRANSFORM AUDIO EMITTED BY THE USER OVER THE TIME INTERVAL INTO A SCORED SEQUENCE OF WORDS 408

APPLY SCORE ENHANCEMENTS TO THE WORDS BASED ON A SIMILARITY OF THE WORDS WITH THE IMAGE FEATURES IN THE LATENT SPACE 410

GENERATE AN ACTION COMMAND IN THE VIRTUAL ENVIRONMENT BASED ON ENHANCED WORD SCORES 412

DONE

FIG. 4

TRAINING SET

1000

TO/FROM XBAR 914

PIPELINE MANAGER 1002

PROP 1004

MPC 1016

PRIMITIVE ENGINE 1014

STREAMING MULTIPROCESSOR 1200

RASTER ENGINE 1006

DPC 1

WDX 1008

MMU 1010

TO/FROM XBAR 914

TO/FROM XBAR 914

1500

INPUT DATA
1520

DATA ASSEMBLY 1504

VERTEX SHADING 1506

PRIMITIVE ASSEMBLY 1508

GEOMETRY SHADING 1510

VIEWPORT SCC 1512

RASTERIZATION 1514

FRAGMENT SHADING 1516

RASTER OPERATIONS 1518

OUTPUT
DATA 1502

SCENE-AWARE SPEECH RECOGNITION USING VISION-LANGUAGE MODELS

BACKGROUND

Systems for speech-to-text transformation input audio signals encoding human speech, and process the input to determine words, logical structures, or other outputs corresponding to text in a particular natural human language. For example, computer systems providing interactive user interfaces may receive spoken words or sentences from a human user. Natural language processing (NLP) algorithms may generate logical structures corresponding to words and sentences corresponding to the inputs.

Historically, such inputs were provided to computer systems in a structured, predictable manner. For example, a user might be required to answer a prompt by selecting or conforming their answer to one of several responses the system is configured to accurately interpret. Such structured method of interaction left little ambiguity as to the proper transformation of spoken words into words or sentences.

Recent advances enable users to interact with computer environments in less structured manners. For example, advanced virtual or augmented reality systems and games may accept spoken inputs unconstrained by the limits imposed by more primitive systems for purposes of generating commands or otherwise interacting with the environment or other users. An ongoing need exists to enable such systems with improved mechanisms to accurately transform free-form natural language spoken inputs into commands and other environmental actions.

Some previous mechanisms to utilize context clues for improved natural language processing train on audio cues in video content. However, voice-over-video often fails to accurately describe or otherwise provide clues to the identify or meaning of low-level visual objects in the scene. Rather, such audio context usually comprises higher level semantics, more commonly actions (e.g., mixing, slicing, baking etc. in cooking videos). Video datasets may also fail to provide context on less-commonly encountered visual objects.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 depicts a command generation process in a virtual environment according to one embodiment.

DETAILED DESCRIPTION

Figure 1:
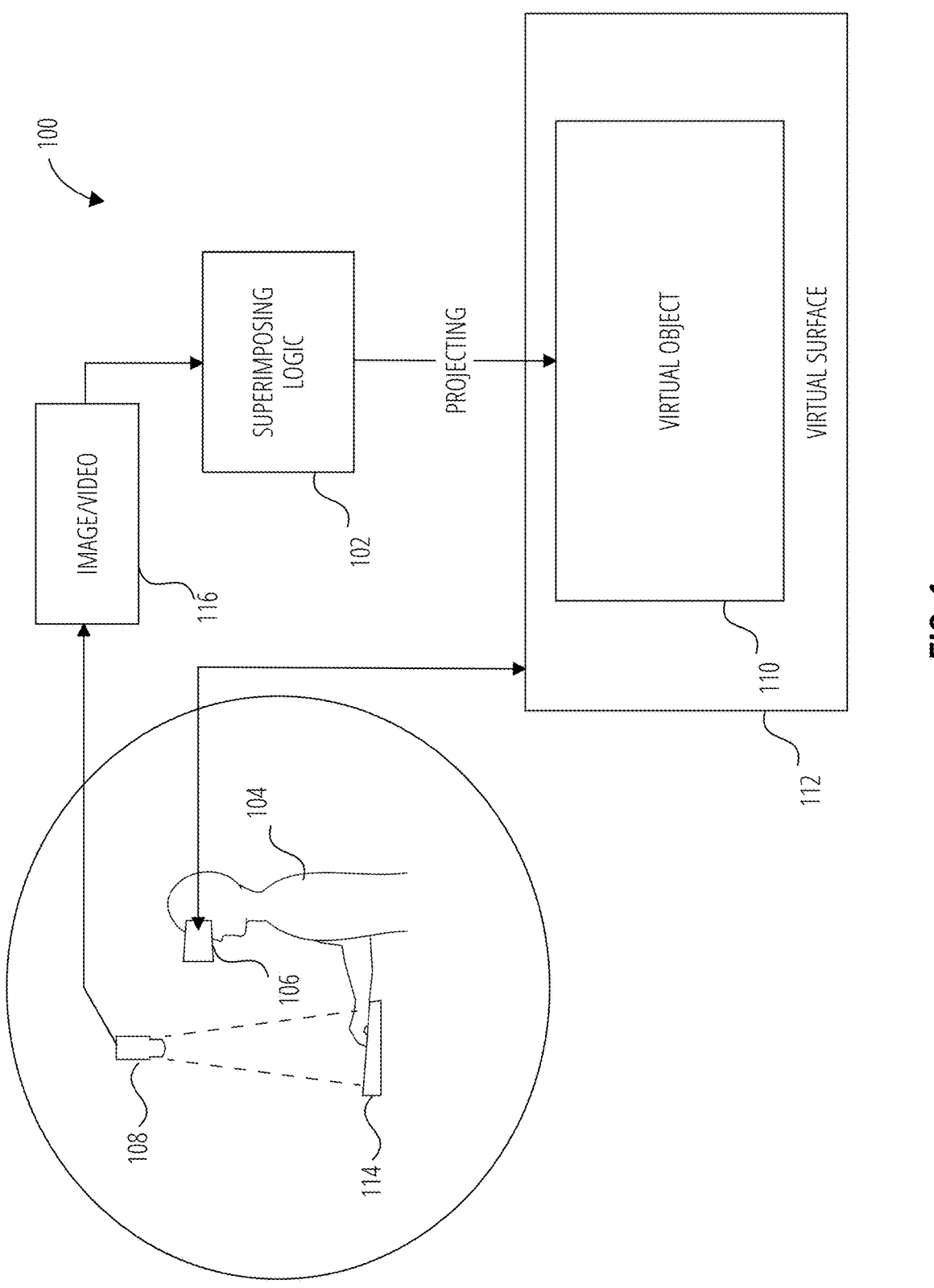
FIG. 1 depicts an embodiment of a superimposing logic 102.

Mechanisms are herein described to improve the accuracy of natural language processing by application of visual context clues. In one aspect, users interact with synthetic agents in a virtual or augmented reality context. The system utilizes context clues about entities, actions and events that are visually present in the scene to improve the accuracy of interpreting and transforming user's spoken inputs into text.

Vision-language matching models generate a score for the match between a text input and a digital image. The mechanisms may utilize one or more vision-language matching models to apply a 'reward' to inferred words comprising an associated metric consistent with the scene.

One example of a vision-language matching model that may be utilized is Contrastive Language-Image Pre-training, i.e. CLIP.

In one example, an ASR system may map audio to a sequence of symbols and generate a distribution over candidate words the symbols may represent at multiple time segments of a user interaction with the environment. This distribution is applied to identify a sequence of words that fits a language model with a sufficiently high probability. The vision-language matching model is then applied as an additional score over words or phrases.

The language model may be applied as a factor in an inference algorithm, as follows:

$$(Y^*)=\mathrm{argmax}_Y p(Y|X) \cdot p(Y)^{\alpha} \cdot L(Y)^{\beta} \cdot p(Y|I)^{\gamma} \qquad \text{Equation 1}$$

where $p(Y|X)$ is the connectionist temporal classification (CTC) conditional probability for a word in the current audio segment generated by the text-to-speech conversion algorithm, $P(Y)^{\alpha}$ is the language model probability for a candidate word at the current segment of the audio, $L(Y)^{\beta}$ is the word insertion bonus, and $p(Y|I)^{\gamma}$ is the score generated by the vision-language matching model that measures how well the sequence Y matches the visual content of an image or images I.

The probability metric $p(Y)$ is determined for each word in a set of candidate words $w_1, \ldots w_t$, for the token at position t in a sequence; and for a prefix sequence sentence $s_t-1=w_1, \ldots w_{t-1}$. The vision-language matching model score of the word $w_j$ represents a likelihood of the sequence $s_t$ ending with word $w_j$. This may be computed as $$\frac{e^{\cos(I,s_i)}}{\sum_i e^{\cos(I,s_i)}} \qquad \text{Equation 2}$$

A latent space, also known as a latent feature space or embedding space, is an embedding of a set of items within a manifold (e.g., a high-dimensional vector space) in which items resembling each other are positioned closer to one another in the latent space. Position within the latent space can be viewed as being defined by a set of latent variables that emerge from the resemblances of objects. Vision-language matching models are typically trained on large image sets labeled with text captions. They may transform features of a text sequence to a latent space, map features of an image to the latent space, and provide a metric of similarity between them.

Vision-language matching models comprise logic that transforms still images and text into a latent space and generate a metric of similarity between the two. Although various embodiments herein may be explained in the context of utilizing CLIP, it should be understood that other embodiment may utilize algorithms other than CLIP that perform similar analysis/transformation on images.

In one aspect, the system first generates an embedding descriptor of an image using a vision-language matching model. For every emitted word or phrase, the system generates a metric of an extent to which the image agrees with the word or phrase. This may be accomplished either by measuring the match of image to word or phrase, or by measuring the match of image to a sequence of words emitted up to a point in time or between points in time.

At a high level, the system may be understood to compare the proximity of images and words or phrases in a latent space to enhance the accuracy of speech-to-text conversion. As noted previously, a latent space is an embedding in which similar features are represented in the space closer to one another, and position within the latent space may be understood as being determined by a set of latent variables that emerge from the resemblances between features of the inputs.

Examples are provided herein on the use of image sequences captured in virtual environments to convert speech to text, or interpret said speech. However, the disclosed mechanisms have more general application than this. For example, the disclosed mechanisms may also be utilized for translation between languages and to automate the close-captioning of videos.

Vision-language matching models are designed for operation on individual images (files or full video frames), not image frame sequences or interpolation frames as are commonly found in video. In one embodiment vision-language matching model scores are computed for multiple frames of the video and the individual scores are statistically aggregated (e.g., using one or more of an average, median, maximum, or minimum calculation). In another embodiment the system may encode an entire sequence of video frames, determine a mean or median or other statistical score in the latent space, and then compute the score over that mean/median.

FIG. 1 depicts an embodiment of a virtualized computing environment 100. This particular example depicts an augmented reality environment, comprising a mixture of camera outputs of actual physical objects and computer-generated virtual objects. In general the environment may partially or entirely virtualized.

A user 104 wearing headset 106 interacts with physical objects virtualized in the virtualized computing environment 100. The user 104 may interact with either an imaging sensor 108 (e.g., a camera) depiction of a physical object, a purely virtual object, or a physical object in the environment for which the system generates a virtualization, e.g., a virtual object 110. The virtual object 110 may be depicted on a virtual surface 112 corresponding to a physical surface 114 in the virtual environment.

The system may utilize superimposing logic 102 that combines sensor output 116 (e.g., image or video) from the imaging sensor 108 with computer-generated virtualizations. The superimposing logic 102 may transform the sensor output 116 into the virtual object 110 superimposed on a virtual surface 112.

In other examples the virtualized computing environment 100 may be a purely virtual reality (VR) environment, not an augmented reality environment. There are many possibilities for the environment—it could be purely virtual, or a physical environment that is completely or partially virtualized.

Figure 2:
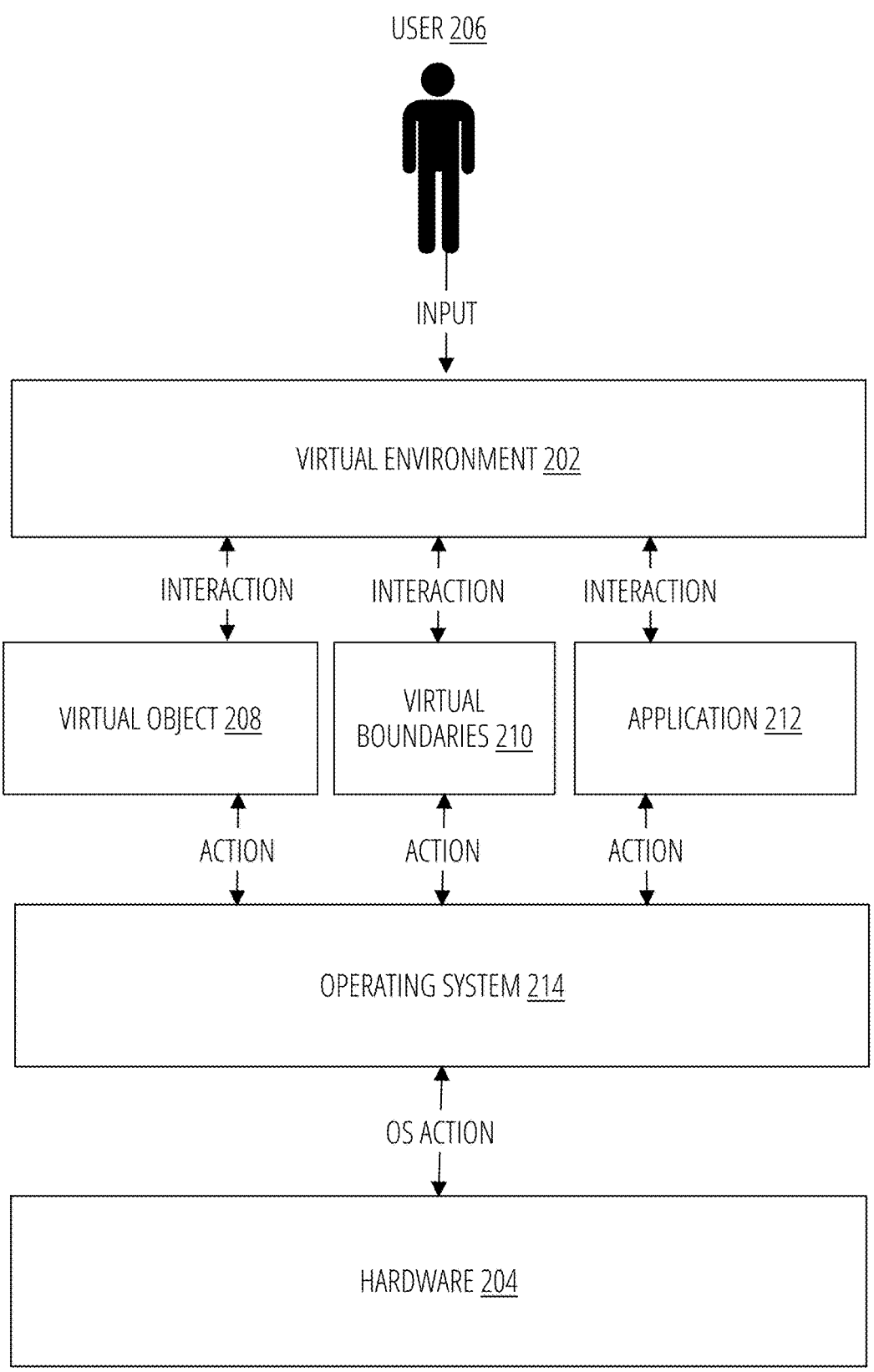
FIG. 2 depicts a system in accordance with one embodiment.

FIG. 2 depicts user interaction with a virtual environment 202 in accordance with one embodiment. A virtual environment 202 executed by hardware 204 receives input from the user 206 and in response sends an interaction signal to virtual objects 208 defined within virtual boundaries 210 (walls, floors, ceilings etc.). The user 206 may also utilize the virtual environment 202 to interact with one or more computer applications 212. These interactions generate action signals (e.g., function calls) to an operating system 214 of the virtual environment 202. The operating system 214, possibly in conjunction with one or more of the applications 212, implements the action in the virtual environment 202.

Figure 3:
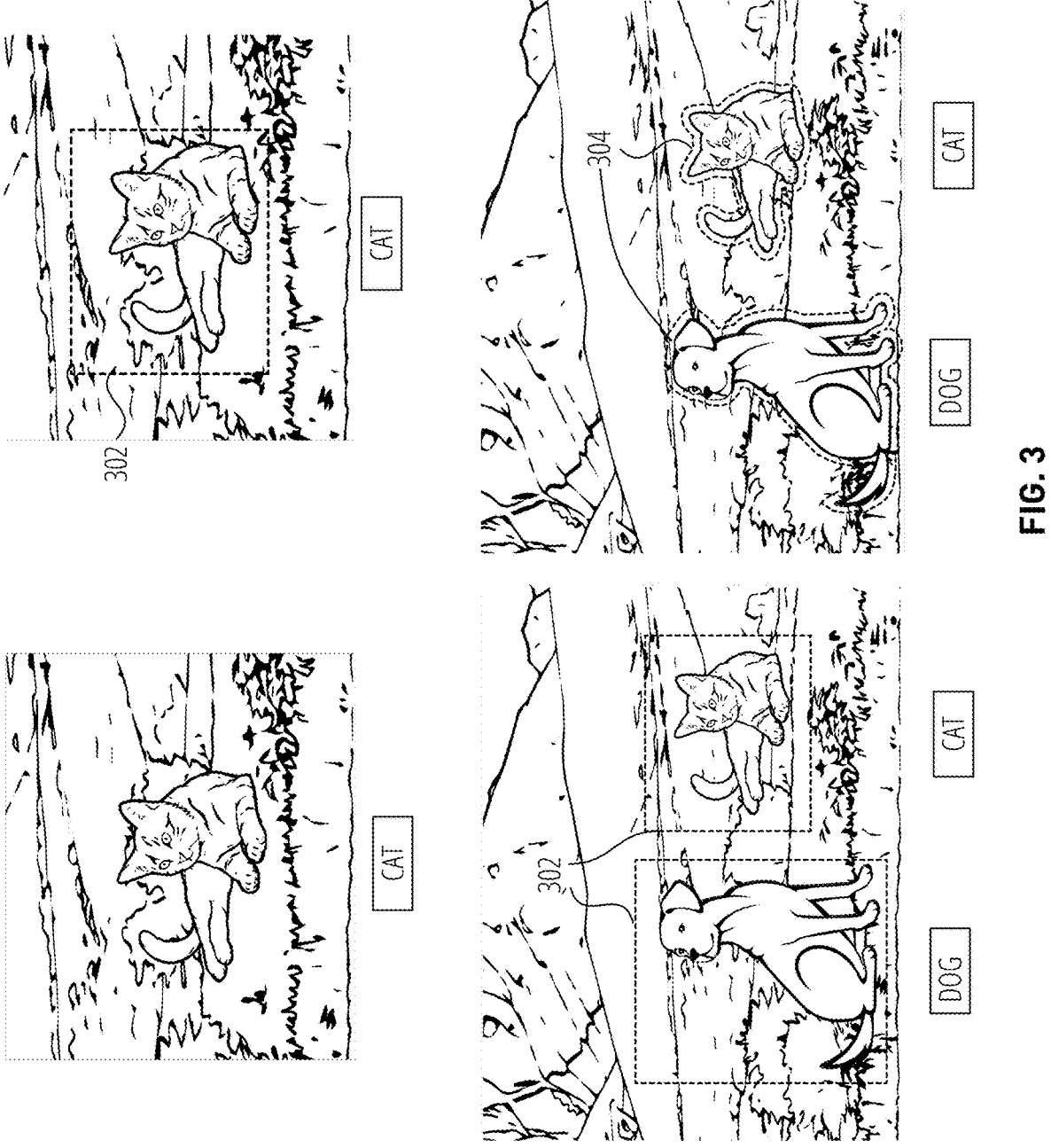
FIG. 3 depicts a comparison between image classification, object detection, and instance segmentation.

FIG. 3 depicts images from a virtual environment captured at different point in time from different user perspectives. The image comprises various objects and attributes. An "object" is a feature of the image with a distinct identity, and an attribute is a feature or quality of an object. In addition to objects, the image comprises pixels that do belong to a particular identifiable object, but instead contribute to the general 'background' or environment of the objects encoded in the image.

Several objects are encoded in the depicted images, e.g., "cat", "dog", and "hill". In a virtual environment, objects may be rendered as distinct entities (e.g., 2D or 3D objects enabled to assume different or changing relative positions in the environment against a background). Objects may also be "embedded" entities (e.g., subsets of pixels in rendered images). In either case the system may capture images of the environment rendered over a time interval. In environments with distinct entities, image capture results in any distinctly rendered entities becoming embedded entities in the images. If the system maintains bounding boxes 302 or segmentation regions 304 for the distinct objects, this information may not be encoded in the captured images.

Likewise, if the system maintains settings indicating features or attributes of the objects, and a boundary indicating a position and extent of the object in the environment, this information may not become part of the captured images. The images become 'wholistic encodings' of any discrete/distinct objects and their features and attributes. These wholistic encodings may be transformed into latent space embeddings by a vision-language matching model.

It will be readily apparent that these mechanisms extend beyond and are applicable to applications beyond virtual or augmented reality. For example, the sequence of images for transformation by a vision-language matching model may be captured from a video stream and utilized along with audio in the video stream to more accurately ascertain the meaning of spoken words in the video.

FIG. 4 illustrates an example routine for generating commands or other actions in a virtual environment according to one embodiment. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes rendering a virtual environment as a scene on a display according to a perspective view of a human user at action 402. For example, the operating system 214 illustrated in FIG. 2 may render a virtual environment as a scene on a display according to a perspective view of a human user. The virtual environment may be rendered on a display from the a perspective view of a human user. For example, a human user wearing a VR or AR headset may orient their view in a particular direction in space, and the perspective view rendered in the headset may pan to that perspective.

According to some examples, the method includes capturing images of the rendered scene from the user's perspective over a time interval at action 404. Images of the rendered scene, from the user's perspective, are captured over a time interval.

According to some examples, the method includes processing the images through a vision-language matching model to generate a latent space of image features at block 406. A vision-language matching model is applied to the captured images. Features of the images are extracted into a high-dimensional feature space, which is transformed into embeddings in a latent space (the latent space may have lower dimensionality than the source feature space). The latent space embeddings may not represent explicit embedded objects in the images (e.g., object recognition need not be performed on the images). Rather, descriptors or classifiers of objects embedded in the images may emerge from the latent space embeddings and may be used to enhance scores/probabilities assigned to words spoken by the user over the time interval.

According to some examples, the method includes transforming audio emitted by the user over the time interval into a scored sequence of words at action 408. For example, the application 212 illustrated in FIG. 2 may transform audio emitted by the user over the time interval into a scored sequence of words. Audio comprising words spoken over the time interval by the user in association with the rendered scene may be transformed into a sequence of words. These words are scored for matches with a language model, individually or as sequences over the time interval. Commonly-available speech-to-text applications or operating system logic may be utilized to convert the audio to words/word sequences.

According to some examples, the method includes applying score enhancements to the words based on a similarity of the words with the image features in the latent space at action 410. For example, the application 212 illustrated in FIG. 2 may apply score enhancements to the words based on a similarity of the words with the image features in the latent space. Scores assigned to the words are enhanced (either positively or negatively) based on proximity of the words and the image embeddings in the latent space.

According to some examples, the method includes generating an action command in the virtual environment based on enhanced word scores at block 412. The enhanced word scores are applied to determine a command action to execute in the virtual environment. The action may for example be some command causing a manipulation or change of the embedded object or in relation to the embedded object, or the scene overall. The action may be a visual message comprising the enhanced words that is displayed and/or communicated to other users in the environment.

The action may for example an operating system action such as removing the object from the scene, or changing the object's attributes, or interacting/influencing the object in some way. The action may also be an application action, such as communicating with, commanding, or cooperating with the object itself (e.g., if the object has an associated behavioral logic component, i.e. is a bot), or with another user in the environment using or in regards to the object.

The system may repeat actions 408 and 410 to generate a running candidate word set based on the decoded word sequence up to a point in time. A currently decoded word may be scored based on the language model and matches images based on a sentence formed to that point in the transcription. Top candidate words are selected, new candidate sentences are formed for each top candidate word, each of these candidate sentences evaluated against the next transcribed word, and so on. In other words, at each time step, the system evaluates the sequence of images captures from the virtual environment or video for fit with the sentence as transcribed thus far. Generally, the system may utilize techniques such as beam search or CTC encoding to maintain a pool of candidate words or phrases at multiple places in a sentence, without collapsing the determination to a single best decision.

There may be a time lag between when a user experiences a perspective view in the environment, and when the user speaks or types text about what they experienced. For example, a user may see an object in one perspective, turn away so that the object is no longer in their perspective view, and then comment on the object. The system may therefor capture and analyze images for an interval that brackets the user's input, either preceding the input in time to some extent, extending beyond the input in time to some extent, or both. For pre-recorded video for example, the system may examine video frames that occur both before, during, and after some spoken audio.

The images applied to the vision-language matching model may be captured solely from one user's perspective, or from the perspectives of multiple user's in a given volume of the virtual environment. By utilizing images from both sets, the system may focus attention on scene features common to multiple users, and thus features more likely to be commented upon. This higher probability may factor into selection of candidate words and sentences for the speech conversion. Likewise, the system may utilize context clues in the speech or inputs of other users occupying the scene volume at the same time, or at previous times. Features of the scenes that multiple users comment on, or have commented on in the past, may be more comment-worthy, and thus assigned higher credence in the vision-language model.

Figure 5:
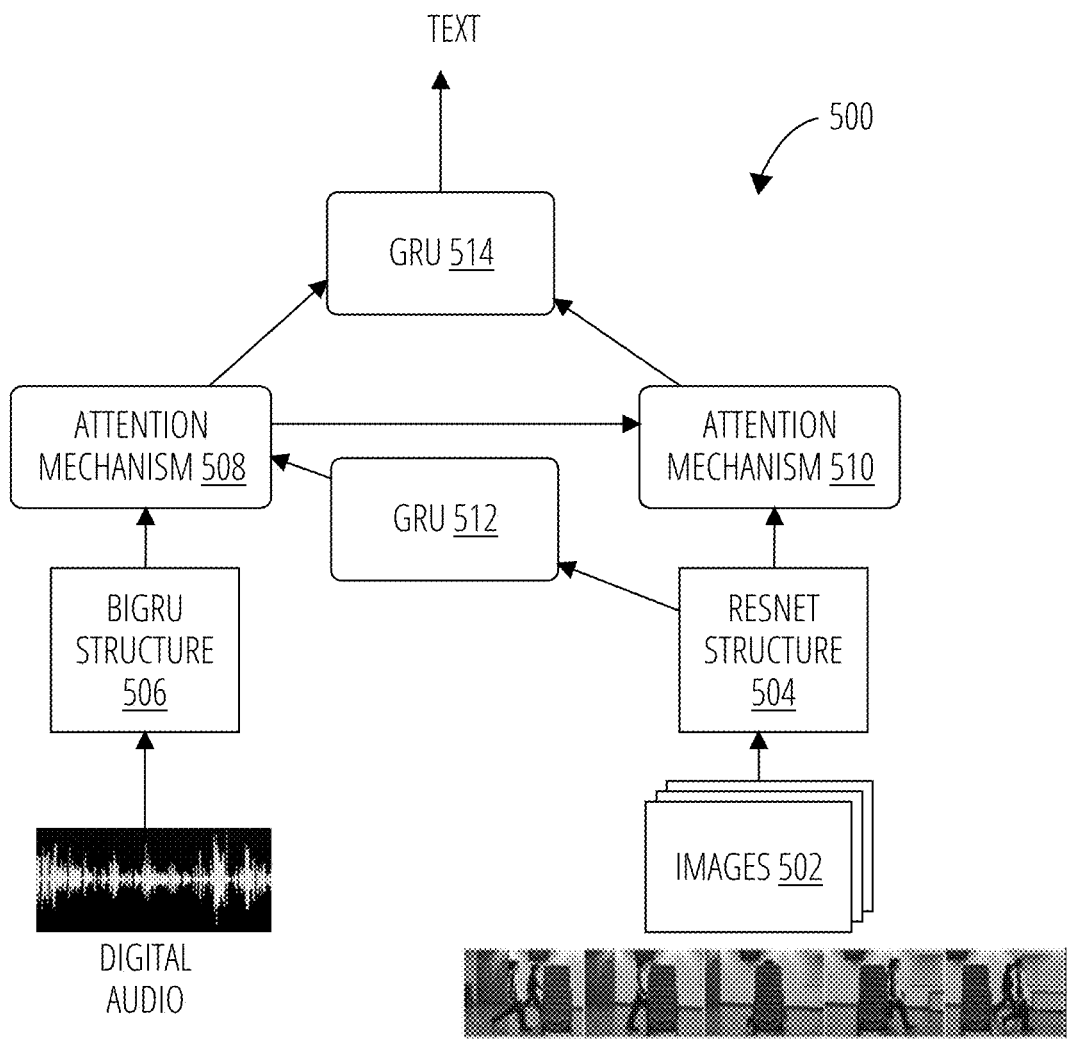
FIG. 5 depicts a speech-to-text conversion system in accordance with one embodiment.

FIG. 5 depicts logic of a prior art speech-to-text conversion system 500. The system 500 is multimodal, utilizing both of digital audio and a sequence of images captures from a virtual environment or digital video related to the digital audio. The acronym "GRU" refers to the well-known Gated Recurrent Unit network structure, a type of Long Short-Term Memory (LSTM) that utilizes fewer gates than a conventional LSTM network, and further utilizes hidden states for memory transfer between recurrent units. LSTMs and GRUs have proven useful for making inferences about sequential inputs. A BiGRU network is a GRU network that processes sequential inputs in both the forward and backward directions.

A sequence of images 502 is encoded through a Resnet structure 504 and digital audio is encoded through a BiGRU structure 506. An attention mechanism 508 is utilized with the BiGRU structure 506, and an attention mechanism 510 is utilized utilized with the Resnet structure 504. The two processing modes combine via GRU 512 network and hierarchical GRU 514 network.

Resnet is a neural network structure that is gateless or open-gated. A type of Resnet that may be utilized for the Resnet structure 504 is the well-known Resnet50. Resnets utilize skip connections to bypass some layers. Typical Resnet models are implemented with double- or triple-layer skips that comprise nonlinearities (ReLU) and batch normalization in between.

In one embodiment the BiGRU structure 506 comprises a plurality (e.g., six) bidirectional LSTM layers each of which is followed by a tanh activation layer.

The GRU networks operate as decoders. An example structure for the GRU 512 is a two-layer stacked GRU. A feed-forward attention mechanism over the states of the GRU 512 is applied to generate a context vector, which is input to the hierarchical GRU 514 network. During decoding, visual features of the images 502 are projected to hidden states and concatenated to the input embedding vector at each timestep before being applied to the GRU 512.

A speech context vector is generated over the encoder states using the attention mechanism 508. The second attention mechanism 510 is applied over the context vector and visual features both (the two vectors are projected into a common space).

Figure 6:
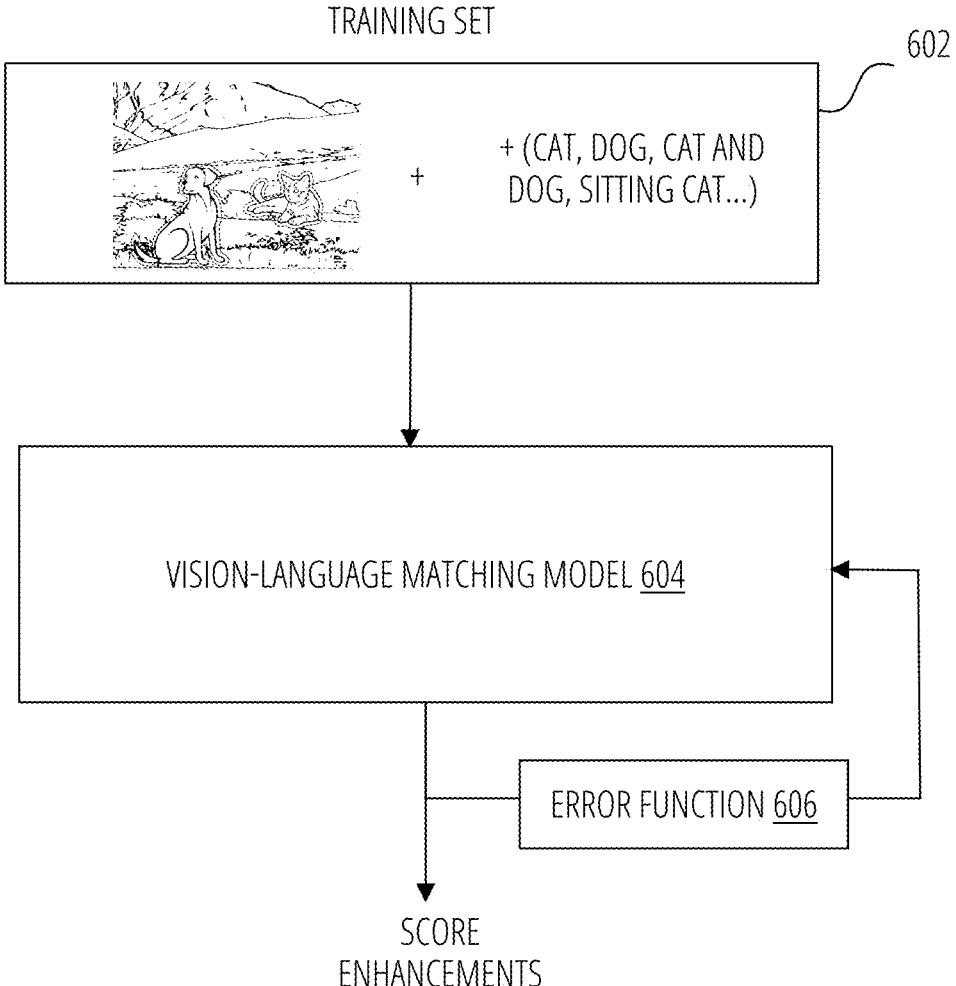
FIG. 6 illustrates an aspect of the subject matter in accordance with one embodiment.

FIG. 6 depicts a vision-language matching model 604 configured to generate score enhancements for tokens comprising candidate words or phrases. The vision-language matching model 604 is trained in manners understood in the art, for example by submitting training sets 602 comprising images labeled with words and phrases matching features of the depictions in the images. (The vision-language matching model 604 may also be trained with words and phrases having a low match to the depictions in the images). The vision-language matching model 604 generates score enhancements corresponding to a degree of match or proximity (in the latent space) between embeddings of the image features and embeddings of the training labels. An error function 606 is utilized to adapt the configuration of the vision-language matching model 604 toward more accurate scoring as training progresses.

Figure 7:
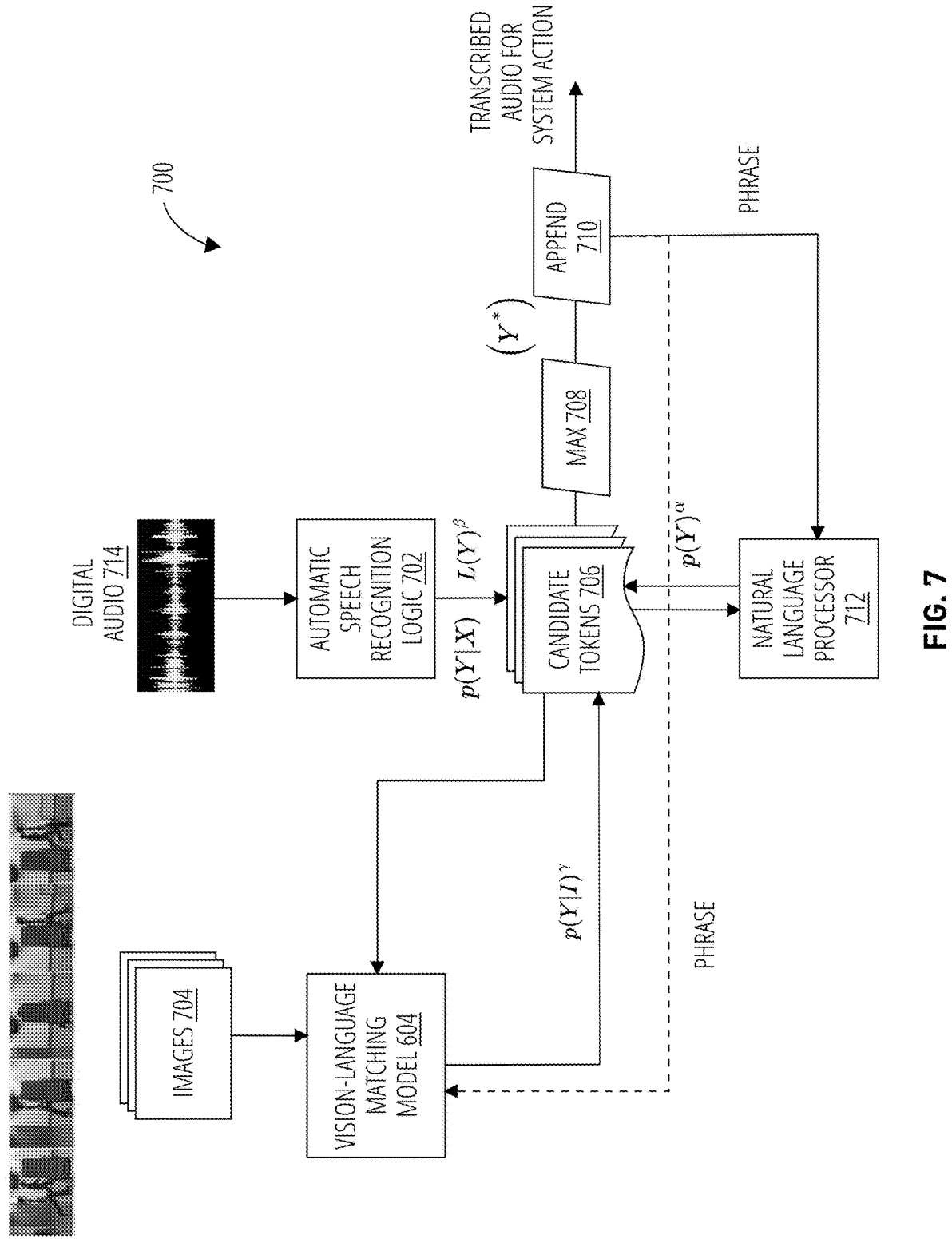
FIG. 7 depicts a speech-to-text conversion system in accordance with one embodiment.

FIG. 7 depicts logic of a speech-to-text conversion system 700 for improved generation of system commands/actions, in accordance with one embodiment. Like the prior art system 500 depicted in FIG. 5, the system 700 is multimodal, utilizing both of digital audio and a sequence of images captures from a virtual environment or digital video related to the digital audio.

In FIG. 7, p(Y|X) is the CTC conditional probability for a word in the current (time interval) digital audio 714 segment generated by the automatic speech recognition logic 702. $P(Y)^\alpha$ is the probability of a fit of the (one or more) candidate tokens 706 to a language model, assigned by the natural language processor 712 at the current segment of the digital audio 714. $P(Y)^\alpha$ is the language model probability for a candidate word at the current segment of the audio, $L(Y)^\beta$ is the word insertion bonus, and $P(Y|I)^\gamma$ is the score generated by the vision-language matching model 604 that measures how well the sequence Y matches the visual content of an image or images 704 exposed to a system user or users in association with the current segment of the digital audio 714.

A probability metric p(Y) is determined for each word in a set of candidate words $w_1, \ldots w_r$, for the token at position t in a sequence; and for a prefix sequence sentence $s_t-1 = w_1, \ldots w_{t-1}$. The vision-language matching model score of the word $w_j$ represents a likelihood of the sequence $s_t$ ending with word $w_j$.

As noted previously, the user or users could be the ones speaking the audio, or different ones. Also, the time interval of the digital audio 714 segment may precede the time interval of user exposure to the images 704, or be at least partially coextensive in time, or may come after the time interval of the user's exposure to the images 704.

The max function 708 selects the candidate word or phrase with a highest score after enhancements are added, and an append operation 710 adds this to the transcribed audio up to that point in time. Not all embodiments may select a single highest-scoring candidate word or phrase; some may select a set of highest-scoring candidates and generate a range of candidate transcribed audio sequences.

The score enhancements are indicative of how closely the tokens align with features of the images 704. The system 700 may be more robust and flexible than the conventional system 500 in that it does not condition the generation of the text on the outcome of an image encoder (e.g., the Resnet structure 504). Unlike the prior art system 500, the system 700 utilizes a vision-language matching model 604 trained (configured) to add score enhancements to tokens (candidate tokens 706, phrases) generated by a natural language processor 712. Other structural and operational differences between the system 700 and the system 500 are readily apparent via a comparison of FIG. 5 and FIG. 7.

Figure 8:
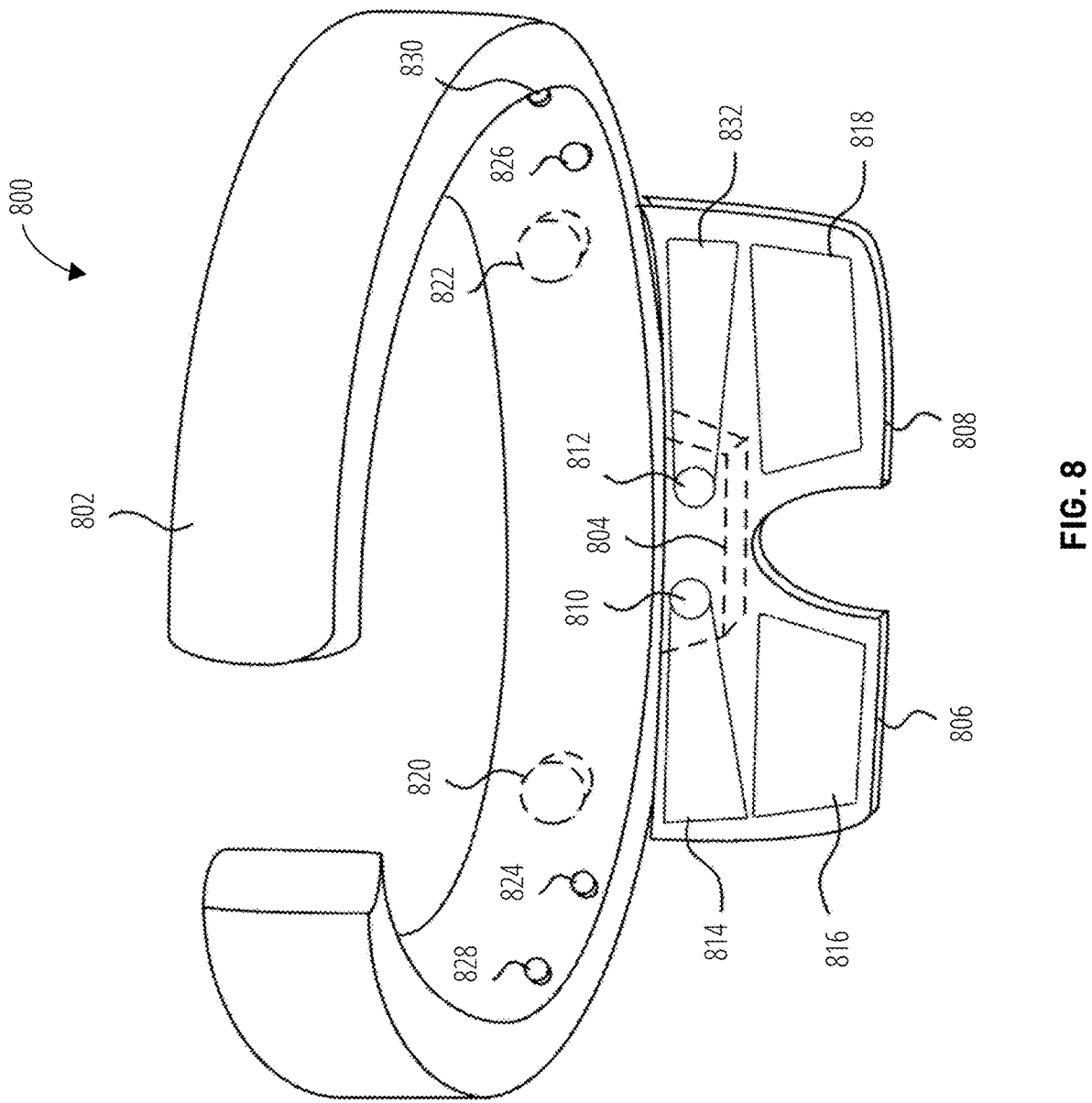
FIG. 8 depicts a device 800 for interacting with a virtual or augmented reality environment, in accordance with one embodiment.

FIG. 8 depicts a perspective view of a wearable augmented reality ("AR") or virtual reality device (device 800). The device 800 takes the form of a wearable headset.

The device 800 comprises a headpiece 802, which is a headband, arranged to be worn on the wearer's head. The headpiece 802 has a central portion 804 intended to fit over the nose bridge of a wearer, and has an inner curvature intended to wrap around the wearer's head above their ears.

The headpiece 802 supports a left optical component 806 and a right optical component 808, which are waveguides. For ease of reference herein an optical component will be considered to be either a left or right component, because in the described embodiment the components are essentially identical apart from being mirror images of each other. Therefore, description pertaining to the left-hand component also pertains to the right-hand component.

The device 800 may comprise a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry known in the art to activate individual pixels of the display to generate an image. Substantially collimated light, from each pixel, falls on an exit pupil of a graphics engine, for example.

At the exit pupil, the collimated light beams are coupled into each of the left optical component 806 and the right optical component 808 into a respective left in-coupling zone 810 and right in-coupling zone 812. In-coupled light is then guided, through a mechanism that involves diffraction and TIR, laterally of the optical component in a respective left intermediate zone 814 and right intermediate zone 832, and also downward into a respective left exit zone 816 and right exit zone 818 where it exits towards the users' eye.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user. In this manner, the left optical component 806 and the right optical component 808 project the displayed image onto the wearer's eyes.

The various optical zones can, for example, be suitably arranged diffractions gratings or holograms. Each optical component has a refractive index n which is such that total internal reflection takes place to guide the beam from the light engine along the respective intermediate expansion zone, and down towards respective the exit zone.

Each optical component is substantially transparent, whereby the wearer can see through it to view a real-world environment in which they are located simultaneously with the projected image, thereby providing an augmented reality experience.

To provide a stereoscopic image, i.e., that is perceived as having 3D structure by the user, slightly different versions of a 2D image can be projected onto each eye for example (i.e., two micro displays), or from the same light engine (i.e., one micro display) using suitable optics to split the light output from the single display.

The device 800 is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the left optical component 806 and right optical component 808 though without the need for the zone structures.

Other headpiece 802 embodiments are also within the scope of the subject matter. For instance, the display optics can equally be attached to the user's head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The device 800 also comprises one or more camera for example left stereo camera 820 and right stereo camera 822 mounted on the headpiece 802 and configured to capture an approximate view ("field of view") from the user's left and right eyes respectfully in this example. The cameras are located towards either side of the user's head on the headpiece 802, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

A left microphone 824 and a right microphone 826 are located at the front of the headpiece (from the perspective of the wearer), and left and right channel speakers, earpiece or other audio output transducers are to the left and right of the headpiece 802. These are in the form of a pair of bone conduction audio transducers functioning as a left speaker 828 and right speaker 830 audio channel output.

To carry out speech to text conversion or other speech processing as described herein, the device 800 may utilize a computing platform comprising one or more graphics processing units and/or central processing units. An example of such a platform that may be configured for this purpose is described below.

The algorithms and techniques disclosed herein may be executed by computing devices utilizing one or more graphic processing unit (GPU) and/or general purpose data processor (e.g., a 'central processing unit or CPU). Exemplary architectures will now be described that may be configured to carry out the techniques disclosed herein on such devices.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 9:
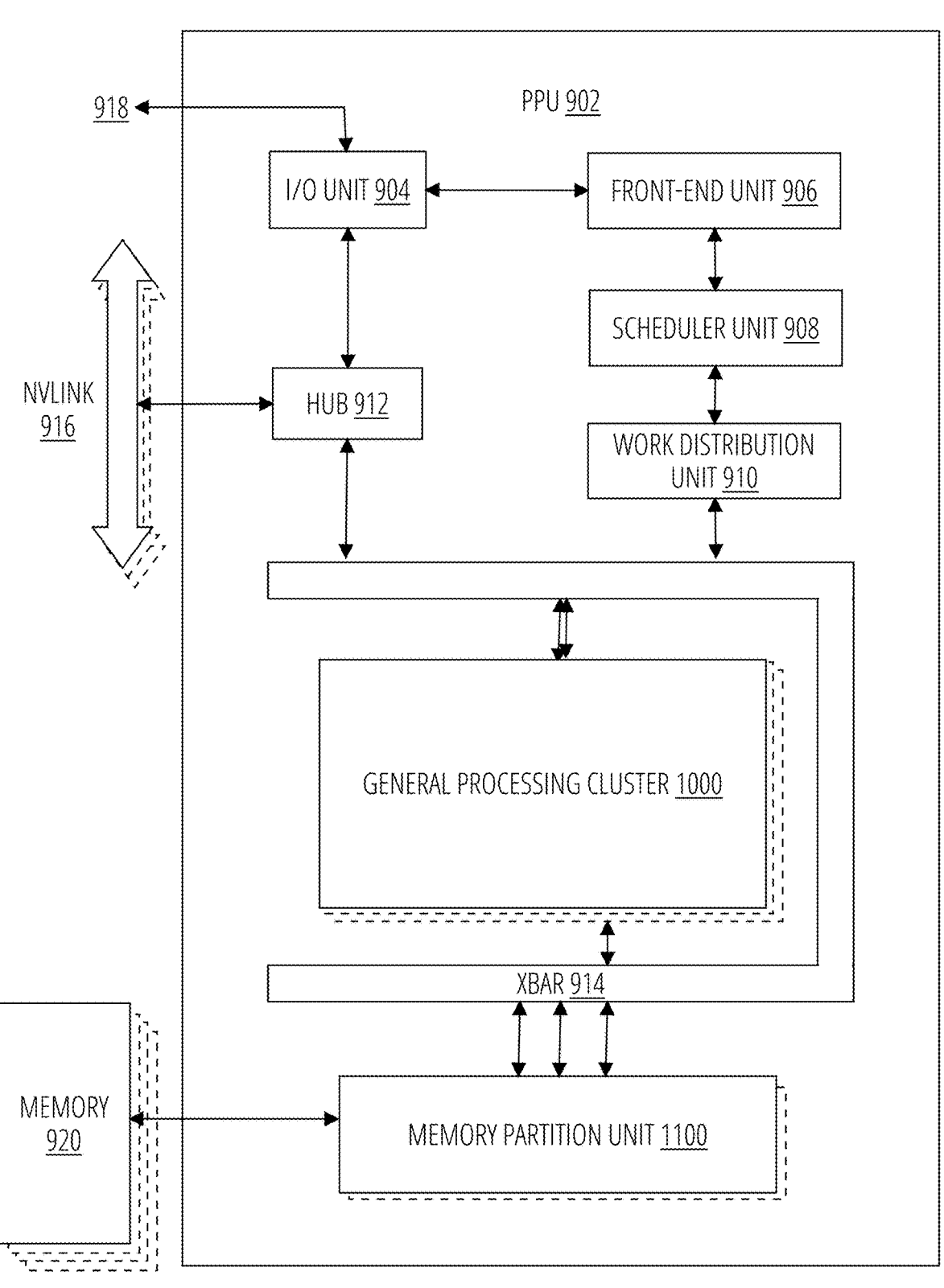
FIG. 9 depicts a parallel processing unit 902 in accordance with one embodiment.

FIG. 9 depicts a parallel processing unit 902, in accordance with an embodiment. In an embodiment, the parallel processing unit 902 is a multi-threaded processor that is implemented on one or more integrated circuit devices. The parallel processing unit 902 is a latency hiding architecture designed to process many threads in parallel. A thread (e.g., a thread of execution) is an instantiation of a set of instructions configured to be executed by the parallel processing unit 902. In an embodiment, the parallel processing unit 902 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 902 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 902 modules may be configured to accelerate thousands of High Performance Computing (HPC), data center, and machine learning applications. The parallel processing unit 902 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 9, the parallel processing unit 902 includes an I/O unit 904, a front-end unit 906, a scheduler unit 908, a work distribution unit 910, a hub 912, a crossbar 914, one or more general processing cluster 1000 modules, and one or more memory partition unit 1100 modules. The parallel processing unit 902 may be connected to a host processor or other parallel processing unit 902 modules via one or more high-speed NVLink 916 interconnects. The parallel processing unit 902 may be connected to a host processor or other peripheral devices via an interconnect 918. The parallel processing unit 902 may also be connected to a local memory comprising a number of memory 920 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 920 may comprise logic to configure the parallel processing unit 902 to carry out aspects of the techniques disclosed herein.

The NVLink 916 interconnect enables systems to scale and include one or more parallel processing unit 902 modules combined with one or more CPUs, supports cache coherence between the parallel processing unit 902 modules and CPUs, and CPU mastering. Data and/or commands may be transmitted by the NVLink 916 through the hub 912 to/from other units of the parallel processing unit 902 such as one or more copy engines, a video encoder, a video decoder, a power management unit, etc. (not explicitly shown). The NVLink 916 is described in more detail in conjunction with FIG. 13.

The I/O unit 904 is configured to transmit and receive communications (e.g., commands, data, etc.) from a host processor (not shown) over the interconnect 918. The I/O unit 904 may communicate with the host processor directly via the interconnect 918 or through one or more intermediate devices such as a memory bridge. In an embodiment, the I/O unit 904 may communicate with one or more other processors, such as one or more parallel processing unit 902 modules via the interconnect 918. In an embodiment, the I/O unit 904 implements a Peripheral Component Interconnect Express (PCIe) interface for communications over a PCIe bus and the interconnect 918 is a PCIe bus. In alternative embodiments, the I/O unit 904 may implement other types of well-known interfaces for communicating with external devices.

The I/O unit 904 decodes packets received via the interconnect 918. In an embodiment, the packets represent commands configured to cause the parallel processing unit 902 to perform various operations. The I/O unit 904 transmits the decoded commands to various other units of the parallel processing unit 902 as the commands may specify. For example, some commands may be transmitted to the front-end unit 906. Other commands may be transmitted to the hub 912 or other units of the parallel processing unit 902 such as one or more copy engines, a video encoder, a video decoder, a power management unit, etc. (not explicitly shown). In other words, the I/O unit 904 is configured to route communications between and among the various logical units of the parallel processing unit 902.

In an embodiment, a program executed by the host processor encodes a command stream in a buffer that provides workloads to the parallel processing unit 902 for processing. A workload may comprise several instructions and data to be processed by those instructions. The buffer is a region in a memory that is accessible (e.g., read/write) by both the host processor and the parallel processing unit 902. For example, the I/O unit 904 may be configured to access the buffer in a system memory connected to the interconnect 918 via memory requests transmitted over the interconnect 918. In an embodiment, the host processor writes the command stream to the buffer and then transmits a pointer to the start of the command stream to the parallel processing unit 902. The front-end unit 906 receives pointers to one or more command streams. The front-end unit 906 manages the one or more streams, reading commands from the streams and forwarding commands to the various units of the parallel processing unit 902.

The front-end unit 906 is coupled to a scheduler unit 908 that configures the various general processing cluster 1000 modules to process tasks defined by the one or more streams. The scheduler unit 908 is configured to track state information related to the various tasks managed by the scheduler unit 908. The state may indicate which general processing cluster 1000 a task is assigned to, whether the task is active or inactive, a priority level associated with the task, and so forth. The scheduler unit 908 manages the execution of a plurality of tasks on the one or more general processing cluster 1000 modules.

The scheduler unit 908 is coupled to a work distribution unit 910 that is configured to dispatch tasks for execution on the general processing cluster 1000 modules. The work distribution unit 910 may track a number of scheduled tasks received from the scheduler unit 908. In an embodiment, the work distribution unit 910 manages a pending task pool and an active task pool for each of the general processing cluster 1000 modules. The pending task pool may comprise a number of slots (e.g., 32 slots) that contain tasks assigned to be processed by a particular general processing cluster 1000. The active task pool may comprise a number of slots (e.g., 4 slots) for tasks that are actively being processed by the general processing cluster 1000 modules. As a general processing cluster 1000 finishes the execution of a task, that task is evicted from the active task pool for the general processing cluster 1000 and one of the other tasks from the pending task pool is selected and scheduled for execution on the general processing cluster 1000. If an active task has been idle on the general processing cluster 1000, such as while waiting for a data dependency to be resolved, then the active task may be evicted from the general processing cluster 1000 and returned to the pending task pool while another task in the pending task pool is selected and scheduled for execution on the general processing cluster 1000.

The work distribution unit 910 communicates with the one or more general processing cluster 1000 modules via crossbar 914. The crossbar 914 is an interconnect network that couples many of the units of the parallel processing unit 902 to other units of the parallel processing unit 902. For example, the crossbar 914 may be configured to couple the work distribution unit 910 to a particular general processing cluster 1000. Although not shown explicitly, one or more other units of the parallel processing unit 902 may also be connected to the crossbar 914 via the hub 912.

The tasks are managed by the scheduler unit 908 and dispatched to a general processing cluster 1000 by the work distribution unit 910. The general processing cluster 1000 is configured to process the task and generate results. The results may be consumed by other tasks within the general processing cluster 1000, routed to a different general processing cluster 1000 via the crossbar 914, or stored in the memory 920. The results can be written to the memory 920 via the memory partition unit 1100 modules, which implement a memory interface for reading and writing data to/from the memory 920. The results can be transmitted to another parallel processing unit 902 or CPU via the NVLink 916. In an embodiment, the parallel processing unit 902 includes a number U of memory partition unit 1100 modules that is equal to the number of separate and distinct memory 920 devices coupled to the parallel processing unit 902. A memory partition unit 1100 will be described in more detail below in conjunction with FIG. 11.

In an embodiment, a host processor executes a driver kernel that implements an application programming interface (API) that enables one or more applications executing on the host processor to schedule operations for execution on the parallel processing unit 902. In an embodiment, multiple compute applications are simultaneously executed by the parallel processing unit 902 and the parallel processing unit 902 provides isolation, quality of service (QoS), and independent address spaces for the multiple compute applications. An application may generate instructions (e.g., API calls) that cause the driver kernel to generate one or more tasks for execution by the parallel processing unit 902. The driver kernel outputs tasks to one or more streams being processed by the parallel processing unit 902. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 12.

Figure 10:
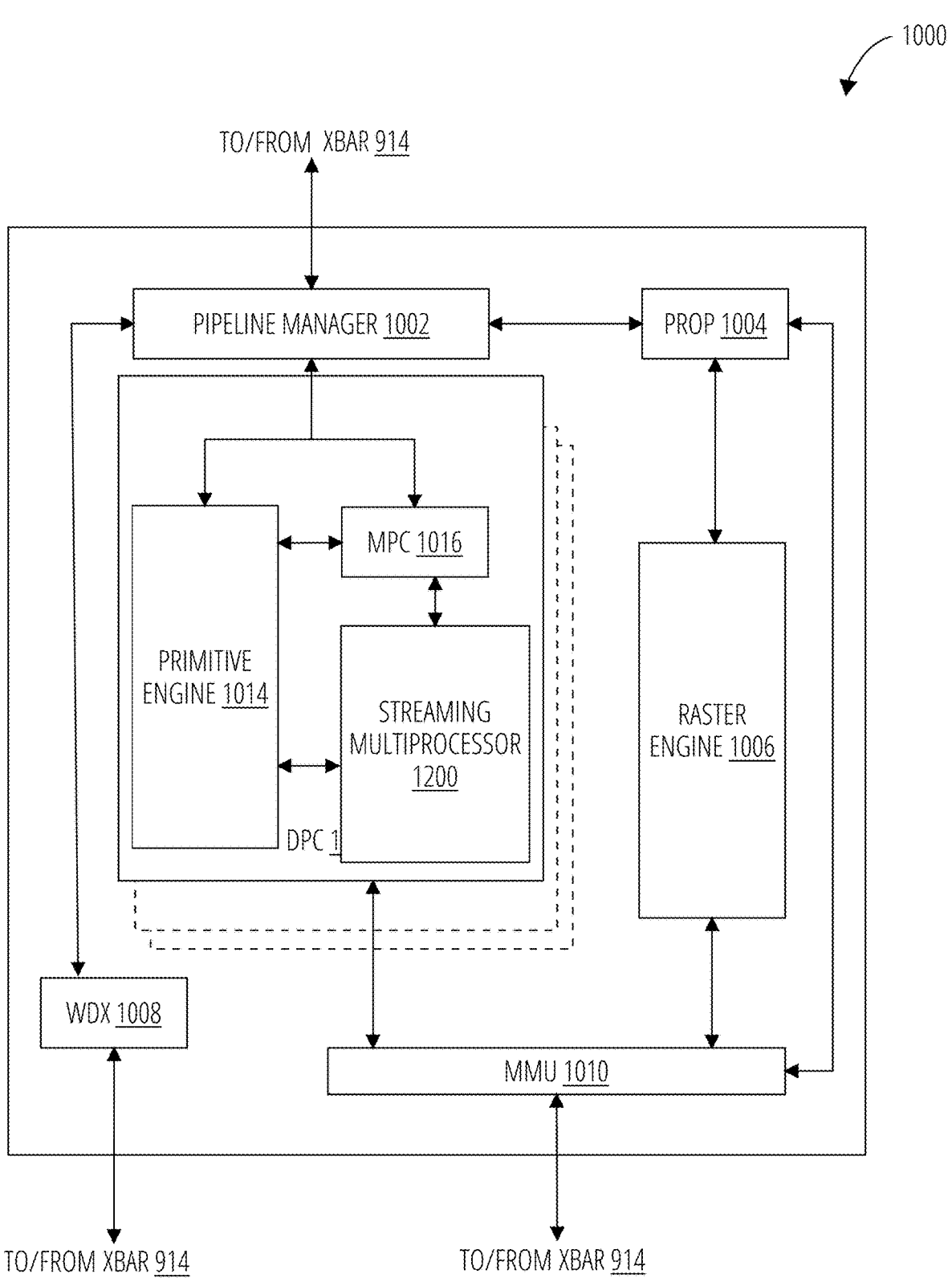
FIG. 10 depicts a general processing cluster 1000 in accordance with one embodiment.

FIG. 10 depicts a general processing cluster 1000 of the parallel processing unit 902 of FIG. 9, in accordance with an embodiment. As shown in FIG. 10, each general processing cluster 1000 includes a number of hardware units for processing tasks. In an embodiment, each general processing cluster 1000 includes a pipeline manager 1002, a pre-raster operations unit 1004, a raster engine 1006, a work distribution crossbar 1008, a memory management unit 1010, and one or more data processing cluster 1012. It will be appreciated that the general processing cluster 1000 of FIG. 10 may include other hardware units in lieu of or in addition to the units shown in FIG. 10.

In an embodiment, the operation of the general processing cluster 1000 is controlled by the pipeline manager 1002. The pipeline manager 1002 manages the configuration of the one or more data processing cluster 1012 modules for processing tasks allocated to the general processing cluster 1000. In an embodiment, the pipeline manager 1002 may configure at least one of the one or more data processing cluster 1012 modules to implement at least a portion of a graphics rendering pipeline. For example, a data processing cluster 1012 may be configured to execute a vertex shader program on the programmable streaming multiprocessor 1200. The pipeline manager 1002 may also be configured to route packets received from the work distribution unit 910 to the appropriate logical units within the general processing cluster 1000. For example, some packets may be routed to fixed function hardware units in the pre-raster operations unit 1004 and/or raster engine 1006 while other packets may be routed to the data processing cluster 1012 modules for processing by the primitive engine 1014 or the streaming multiprocessor 1200. In an embodiment, the pipeline manager 1002 may configure at least one of the one or more data processing cluster 1012 modules to implement a neural network model and/or a computing pipeline.

Figure 11:
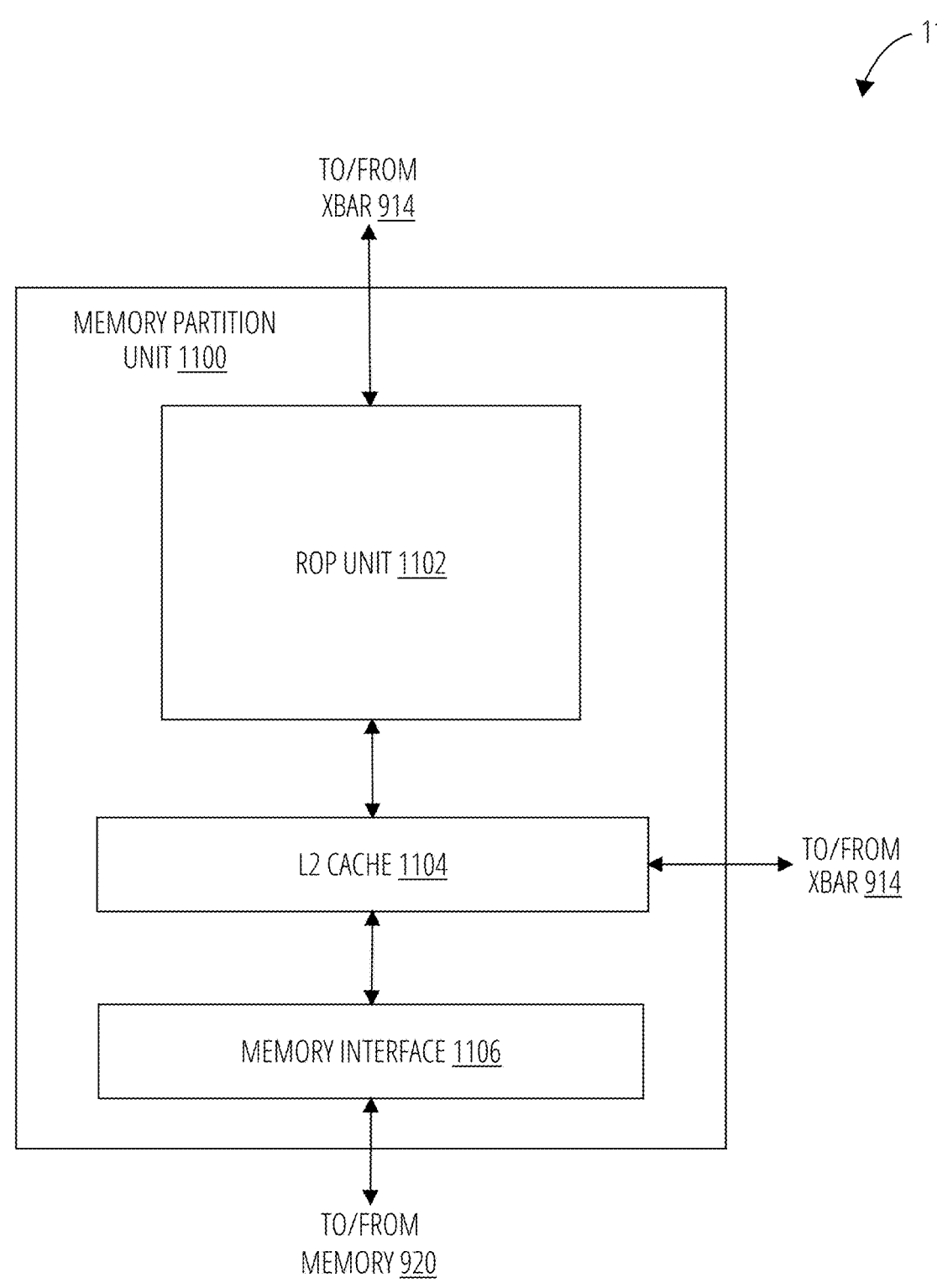
FIG. 11 depicts a memory partition unit 1100 in accordance with one embodiment.

The pre-raster operations unit 1004 is configured to route data generated by the raster engine 1006 and the data processing cluster 1012 modules to a Raster Operations (ROP) unit, described in more detail in conjunction with FIG. 11. The pre-raster operations unit 1004 may also be configured to perform optimizations for color blending, organize pixel data, perform address translations, and the like.

The raster engine 1006 includes a number of fixed function hardware units configured to perform various raster operations. In an embodiment, the raster engine 1006 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1006 comprises fragments to be processed, for example, by a fragment shader implemented within a data processing cluster 1012.

Each data processing cluster 1012 included in the general processing cluster 1000 includes an M-pipe controller 1016, a primitive engine 1014, and one or more streaming multiprocessor 1200 modules. The M-pipe controller 1016 controls the operation of the data processing cluster 1012, routing packets received from the pipeline manager 1002 to the appropriate units in the data processing cluster 1012. For example, packets associated with a vertex may be routed to the primitive engine 1014, which is configured to fetch vertex attributes associated with the vertex from the memory 920. In contrast, packets associated with a shader program may be transmitted to the streaming multiprocessor 1200.

The streaming multiprocessor 1200 comprises a programmable streaming processor that is configured to process tasks represented by a number of threads. Each streaming multiprocessor 1200 is multi-threaded and configured to execute a plurality of threads (e.g., 32 threads) from a particular group of threads concurrently. In an embodiment, the streaming multiprocessor 1200 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1200 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1200 will be described in more detail below in conjunction with FIG. 12.

The memory management unit 1010 provides an interface between the general processing cluster 1000 and the memory partition unit 1100. The memory management unit 1010 may provide translation of virtual addresses into physical addresses, memory protection, and arbitration of memory requests. In an embodiment, the memory management unit 1010 provides one or more translation lookaside buffers (TLBs) for performing translation of virtual addresses into physical addresses in the memory 920.

FIG. 11 depicts a memory partition unit 1100 of the parallel processing unit 902 of FIG. 9, in accordance with an embodiment. As shown in FIG. 11, the memory partition unit 1100 includes a raster operations unit 1102, a level two cache 1104, and a memory interface 1106. The memory interface 1106 is coupled to the memory 920. Memory interface 1106 may implement 32, 64, 128, 1024-bit data buses, or the like, for high-speed data transfer. In an embodiment, the parallel processing unit 902 incorporates U memory interface 1106 modules, one memory interface 1106 per pair of memory partition unit 1100 modules, where each pair of memory partition unit 1100 modules is connected to a corresponding memory 920 device. For example, parallel processing unit 902 may be connected to up to Y memory 920 devices, such as high bandwidth memory stacks or graphics double-data-rate, version 5, synchronous dynamic random access memory, or other types of persistent storage.

In an embodiment, the memory interface 1106 implements an HBM2 memory interface and Y equals half U. In an embodiment, the HBM2 memory stacks are located on the same physical package as the parallel processing unit 902, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 920 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 902 modules process very large datasets and/or run applications for extended periods.

In an embodiment, the parallel processing unit 902 implements a multi-level memory hierarchy. In an embodiment, the memory partition unit 1100 supports a unified memory to provide a single unified virtual address space for CPU and parallel processing unit 902 memory, enabling data sharing between virtual memory systems. In an embodiment the frequency of accesses by a parallel processing unit 902 to memory located on other processors is traced to ensure that memory pages are moved to the physical memory of the parallel processing unit 902 that is accessing the pages more frequently. In an embodiment, the NVLink 916 supports address translation services allowing the parallel processing unit 902 to directly access a CPU's page tables and providing full access to CPU memory by the parallel processing unit 902.

In an embodiment, copy engines transfer data between multiple parallel processing unit 902 modules or between parallel processing unit 902 modules and CPUs. The copy engines can generate page faults for addresses that are not mapped into the page tables. The memory partition unit 1100 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 920 or other system memory may be fetched by the memory partition unit 1100 and stored in the level two cache 1104, which is located on-chip and is shared between the various general processing cluster 1000 modules. As shown, each memory partition unit 1100 includes a portion of the level two cache 1104 associated with a corresponding memory 920 device. Lower level caches may then be implemented in various units within the general processing cluster 1000 modules. For example, each of the streaming multiprocessor 1200 modules may implement an L1 cache. The L1 cache is private memory that is dedicated to a particular streaming multiprocessor 1200. Data from the level two cache 1104 may be fetched and stored in each of the L1 caches for processing in the functional units of the streaming multiprocessor 1200 modules. The level two cache 1104 is coupled to the memory interface 1106 and the crossbar 914.

The raster operations unit 1102 performs graphics raster operations related to pixel color, such as color compression, pixel blending, and the like. The raster operations unit 1102 also implements depth testing in conjunction with the raster engine 1006, receiving a depth for a sample location associated with a pixel fragment from the culling engine of the raster engine 1006. The depth is tested against a corresponding depth in a depth buffer for a sample location associated with the fragment. If the fragment passes the depth test for the sample location, then the raster operations unit 1102 updates the depth buffer and transmits a result of the depth test to the raster engine 1006. It will be appreciated that the number of partition memory partition unit 1100 modules may be different than the number of general processing cluster 1000 modules and, therefore, each raster operations unit 1102 may be coupled to each of the general processing cluster 1000 modules. The raster operations unit 1102 tracks packets received from the different general processing cluster 1000 modules and determines which general processing cluster 1000 that a result generated by the raster operations unit 1102 is routed to through the crossbar 914. Although the raster operations unit 1102 is included within the memory partition unit 1100 in FIG. 11, in other embodiment, the raster operations unit 1102 may be outside of the memory partition unit 1100. For example, the raster operations unit 1102 may reside in the general processing cluster 1000 or another unit.

Figure 12:
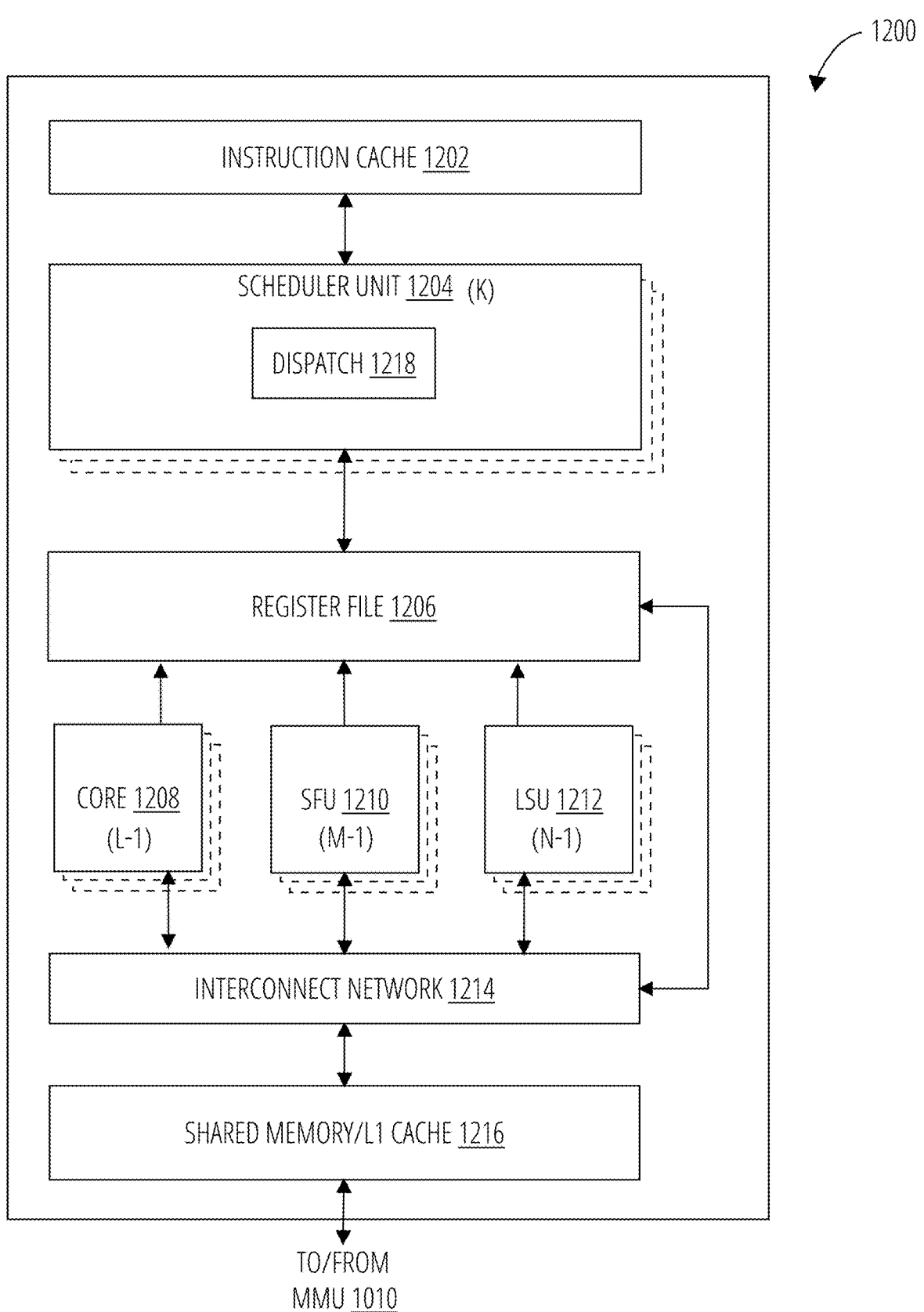
FIG. 12 depicts a streaming multiprocessor 1200 in accordance with one embodiment.

FIG. 12 illustrates the streaming multiprocessor 1200 of FIG. 10, in accordance with an embodiment. As shown in FIG. 12, the streaming multiprocessor 1200 includes an instruction cache 1202, one or more scheduler unit 1204 modules (e.g., such as scheduler unit 908), a register file 1206, one or more processing core 1208 modules, one or more special function unit 1210 modules, one or more load/store unit 1212 modules, an interconnect network 1214, and a shared memory/L1 cache 1216.

As described above, the work distribution unit 910 dispatches tasks for execution on the general processing cluster 1000 modules of the parallel processing unit 902. The tasks are allocated to a particular data processing cluster 1012 within a general processing cluster 1000 and, if the task is associated with a shader program, the task may be allocated to a streaming multiprocessor 1200. The scheduler unit 908 receives the tasks from the work distribution unit 910 and manages instruction scheduling for one or more thread blocks assigned to the streaming multiprocessor 1200. The scheduler unit 1204 schedules thread blocks for execution as warps of parallel threads, where each thread block is allocated at least one warp. In an embodiment, each warp executes 32 threads. The scheduler unit 1204 may manage a plurality of different thread blocks, allocating the warps to the different thread blocks and then dispatching instructions from the plurality of different cooperative groups to the various functional units (e.g., core 1208 modules, special function unit 1210 modules, and load/store unit 1212 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1218 unit is configured within the scheduler unit 1204 to transmit instructions to one or more of the functional units. In one embodiment, the scheduler unit 1204 includes two dispatch 1218 units that enable two different instructions from the same warp to be dispatched during each clock cycle. In alternative embodiments, each scheduler unit 1204 may include a single dispatch 1218 unit or additional dispatch 1218 units.

Each streaming multiprocessor 1200 includes a register file 1206 that provides a set of registers for the functional units of the streaming multiprocessor 1200. In an embodiment, the register file 1206 is divided between each of the functional units such that each functional unit is allocated a dedicated portion of the register file 1206. In another embodiment, the register file 1206 is divided between the different warps being executed by the streaming multiprocessor 1200. The register file 1206 provides temporary storage for operands connected to the data paths of the functional units.

Each streaming multiprocessor 1200 comprises L processing core 1208 modules. In an embodiment, the streaming multiprocessor 1200 includes a large number (e.g., 128, etc.) of distinct processing core 1208 modules. Each core 1208 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1208 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1208 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1200 also comprises M special function unit 1210 modules that perform special functions (e.g., attribute evaluation, reciprocal square root, and the like). In an embodiment, the special function unit 1210 modules may include a tree traversal unit configured to traverse a hierarchical tree data structure. In an embodiment, the special function unit 1210 modules may include texture unit configured to perform texture map filtering operations. In an embodiment, the texture units are configured to load texture maps (e.g., a 2D array of texels) from the memory 920 and sample the texture maps to produce sampled texture values for use in shader programs executed by the streaming multiprocessor 1200. In an embodiment, the texture maps are stored in the shared memory/L1 cache 1216. The texture units implement texture operations such as filtering operations using mip-maps (e.g., texture maps of varying levels of detail). In an embodiment, each streaming multiprocessor 1200 includes two texture units.

Each streaming multiprocessor 1200 also comprises N load/store unit 1212 modules that implement load and store operations between the shared memory/L1 cache 1216 and the register file 1206. Each streaming multiprocessor 1200 includes an interconnect network 1214 that connects each of the functional units to the register file 1206 and the load/ store unit 1212 to the register file 1206 and shared memory/ L1 cache 1216. In an embodiment, the interconnect network 1214 is a crossbar that can be configured to connect any of the functional units to any of the registers in the register file 1206 and connect the load/store unit 1212 modules to the register file 1206 and memory locations in shared memory/ L1 cache 1216.

The shared memory/L1 cache 1216 is an array of on-chip memory that allows for data storage and communication between the streaming multiprocessor 1200 and the primitive engine 1014 and between threads in the streaming multiprocessor 1200. In an embodiment, the shared memory/L1 cache 1216 comprises 128 KB of storage capacity and is in the path from the streaming multiprocessor 1200 to the memory partition unit 1100. The shared memory/L1 cache 1216 can be used to cache reads and writes. One or more of the shared memory/L1 cache 1216, level two cache 1104, and memory 920 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1216 enables the shared memory/L1 cache 1216 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 9, are bypassed, creating a much simpler programming model. In the general purpose parallel computation configuration, the work distribution unit 910 assigns and distributes blocks of threads directly to the data processing cluster 1012 modules. The threads in a block execute the same program, using a unique thread ID in the calculation to ensure each thread generates unique results, using the streaming multiprocessor 1200 to execute the program and perform calculations, shared memory/L1 cache 1216 to communicate between threads, and the load/ store unit 1212 to read and write global memory through the shared memory/L1 cache 1216 and the memory partition unit 1100. When configured for general purpose parallel computation, the streaming multiprocessor 1200 can also write commands that the scheduler unit 908 can use to launch new work on the data processing cluster 1012 modules.

The parallel processing unit 902 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 902 is embodied on a single semiconductor substrate. In another embodiment, the parallel processing unit 902 is included in a system-on-a-chip (SoC) along with one or more other devices such as additional parallel processing unit 902 modules, the memory 920, a reduced instruction set computer (RISC) CPU, a memory management unit (MMU), a digital-to-analog converter (DAC), and the like.

In an embodiment, the parallel processing unit 902 may be included on a graphics card that includes one or more memory devices. The graphics card may be configured to interface with a PCIe slot on a motherboard of a desktop computer. In yet another embodiment, the parallel processing unit 902 may be an integrated graphics processing unit (iGPU) or parallel processor included in the chipset of the motherboard.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13:
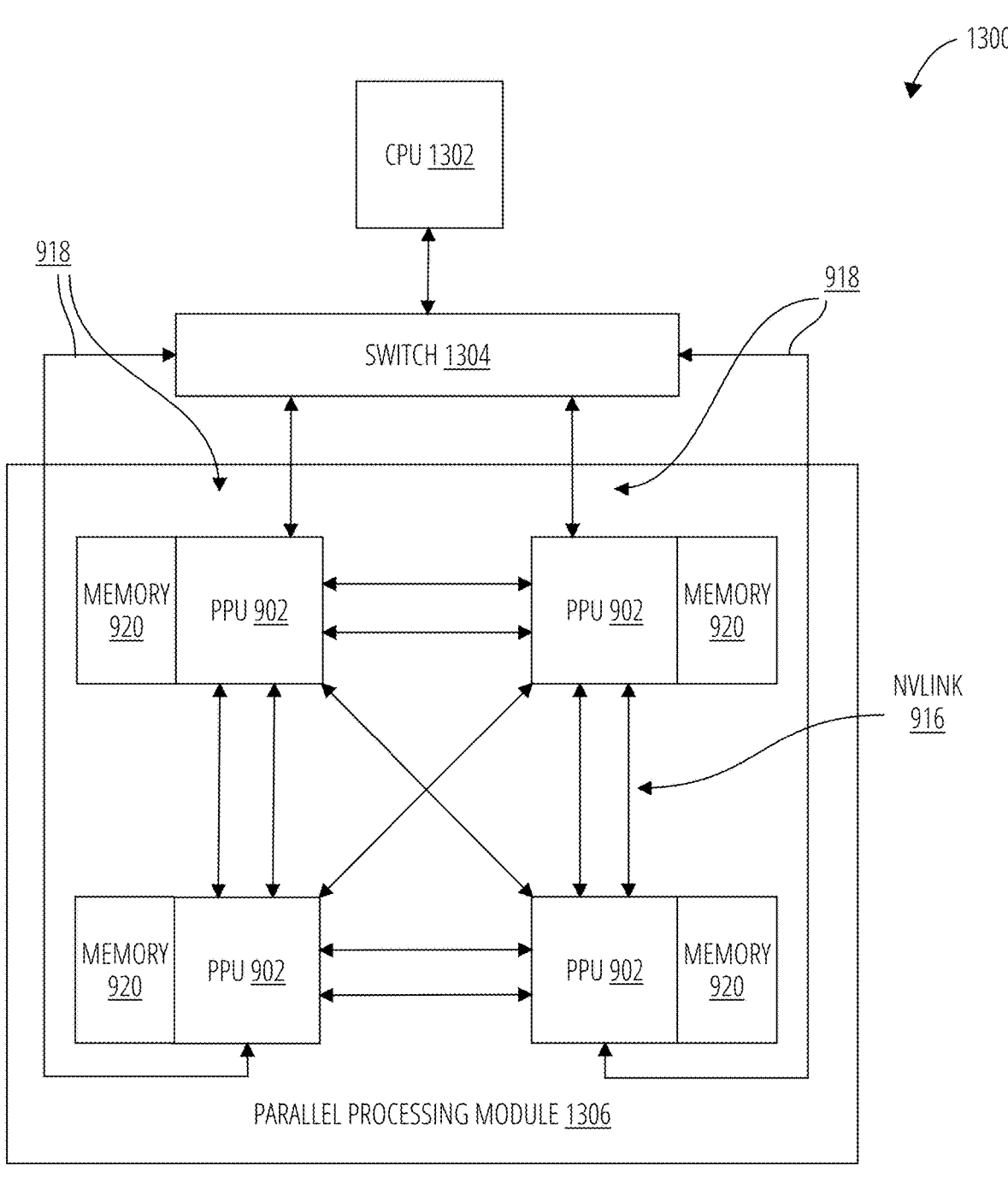
FIG. 13 depicts a processing system 1300 in accordance with one embodiment.

FIG. 13 is a conceptual diagram of a processing system 1300 implemented using the parallel processing unit 902 of FIG. 9, in accordance with an embodiment. The processing system 1300 includes a central processing unit 1302, switch 1304, and multiple parallel processing unit 902 modules each and respective memory 920 modules. The NVLink 916 provides high-speed communication links between each of the parallel processing unit 902 modules. Although a particular number of NVLink 916 and interconnect 918 connections are illustrated in FIG. 13, the number of connections to each parallel processing unit 902 and the central processing unit 1302 may vary. The switch 1304 interfaces between the interconnect 918 and the central processing unit 1302. The parallel processing unit 902 modules, memory 920 modules, and NVLink 916 connections may be situated on a single semiconductor platform to form a parallel processing module 1306. In an embodiment, the switch 1304 supports two or more protocols to interface between various different connections and/or links.

In another embodiment (not shown), the NVLink 916 provides one or more high-speed communication links between each of the parallel processing unit modules (parallel processing unit 902, parallel processing unit 902, parallel processing unit 902, and parallel processing unit 902) and the central processing unit 1302 and the switch 1304 interfaces between the interconnect 918 and each of the parallel processing unit modules. The parallel processing unit modules, memory 920 modules, and interconnect 918 may be situated on a single semiconductor platform to form a parallel processing module 1306. In yet another embodiment (not shown), the interconnect 918 provides one or more communication links between each of the parallel processing unit modules and the central processing unit 1302 and the switch 1304 interfaces between each of the parallel processing unit modules using the NVLink 916 to provide one or more high-speed communication links between the parallel processing unit modules. In another embodiment (not shown), the NVLink 916 provides one or more high-speed communication links between the parallel processing unit modules and the central processing unit 1302 through the switch 1304. In yet another embodiment (not shown), the interconnect 918 provides one or more communication links between each of the parallel processing unit modules directly. One or more of the NVLink 916 high-speed communication links may be implemented as a physical NVLink interconnect or either an on-chip or on-die interconnect using the same protocol as the NVLink 916.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1306 may be implemented as a circuit board substrate and each of the parallel processing unit modules and/or memory 920 modules may be packaged devices. In an embodiment, the central processing unit 1302, switch 1304, and the parallel processing module 1306 are situated on a single semiconductor platform.

In an embodiment, the signaling rate of each NVLink 916 is 20 to 25 Gigabits/second and each parallel processing unit module includes six NVLink 916 interfaces (as shown in FIG. 13, five NVLink 916 interfaces are included for each parallel processing unit module). Each NVLink 916 provides a data transfer rate of 25 Gigabytes/second in each direction, with six links providing 300 Gigabytes/second. The NVLink 916 can be used exclusively for PPU-to-PPU communication as shown in FIG. 13, or some combination of PPU-to-PPU and PPU-to-CPU, when the central processing unit 1302 also includes one or more NVLink 916 interfaces.

In an embodiment, the NVLink 916 allows direct load/store/atomic access from the central processing unit 1302 to each parallel processing unit module's memory 920. In an embodiment, the NVLink 916 supports coherency operations, allowing data read from the memory 920 modules to be stored in the cache hierarchy of the central processing unit 1302, reducing cache access latency for the central processing unit 1302. In an embodiment, the NVLink 916 includes support for Address Translation Services (ATS), enabling the parallel processing unit module to directly access page tables within the central processing unit 1302. One or more of the NVLink 916 may also be configured to operate in a low-power mode.

Figure 14:
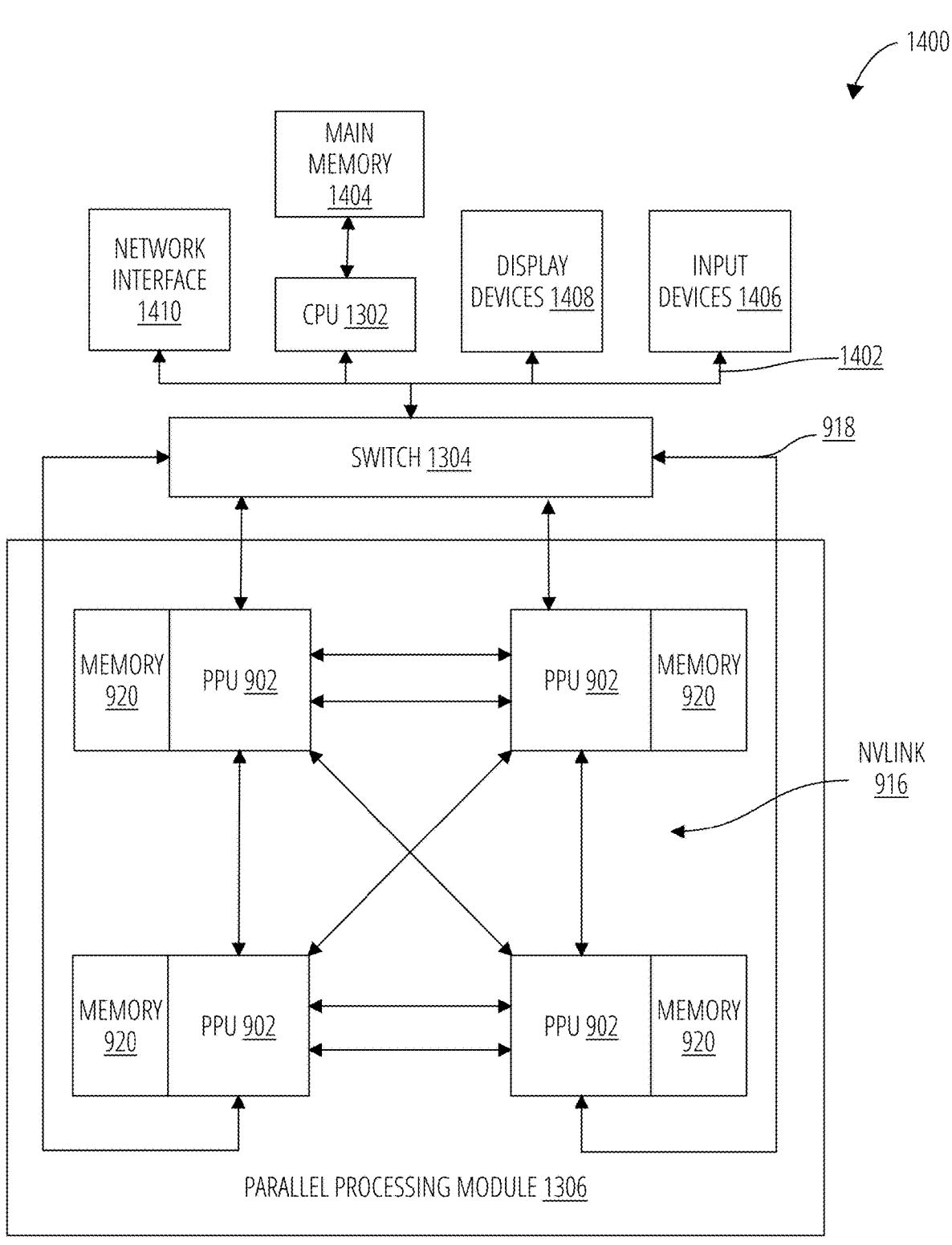
FIG. 14 depicts an exemplary processing system 1400 in accordance with another embodiment.

FIG. 14 depicts an exemplary processing system 1400 in which the various architecture and/or functionality of the various previous embodiments may be implemented. As shown, an exemplary processing system 1400 is provided including at least one central processing unit 1302 that is connected to a communications bus 1402. The communication communications bus 1402 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1400 also includes a main memory 1404. Control logic (software) and data are stored in the main memory 1404 which may take the form of random access memory (RAM).

The exemplary processing system 1400 also includes input devices 1406, the parallel processing module 1306, and display devices 1408, e.g. a conventional CRT (cathode ray tube), LCD (liquid crystal display), LED (light emitting diode), plasma display or the like. User input may be received from the input devices 1406, e.g., keyboard, mouse, touchpad, microphone, and the like. Each of the foregoing modules and/or devices may even be situated on a single semiconductor platform to form the exemplary processing system 1400. Alternately, the various modules may also be situated separately or in various combinations of semiconductor platforms per the desires of the user.

Further, the exemplary processing system 1400 may be coupled to a network (e.g., a telecommunications network, local area network (LAN), wireless network, wide area network (WAN) such as the Internet, peer-to-peer network, cable network, or the like) through a network interface 1410 for communication purposes.

The exemplary processing system 1400 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1404 and/or the secondary storage. Such computer programs, when executed, enable the exemplary processing system 1400 to perform various functions. The main memory 1404, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1400 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 15:
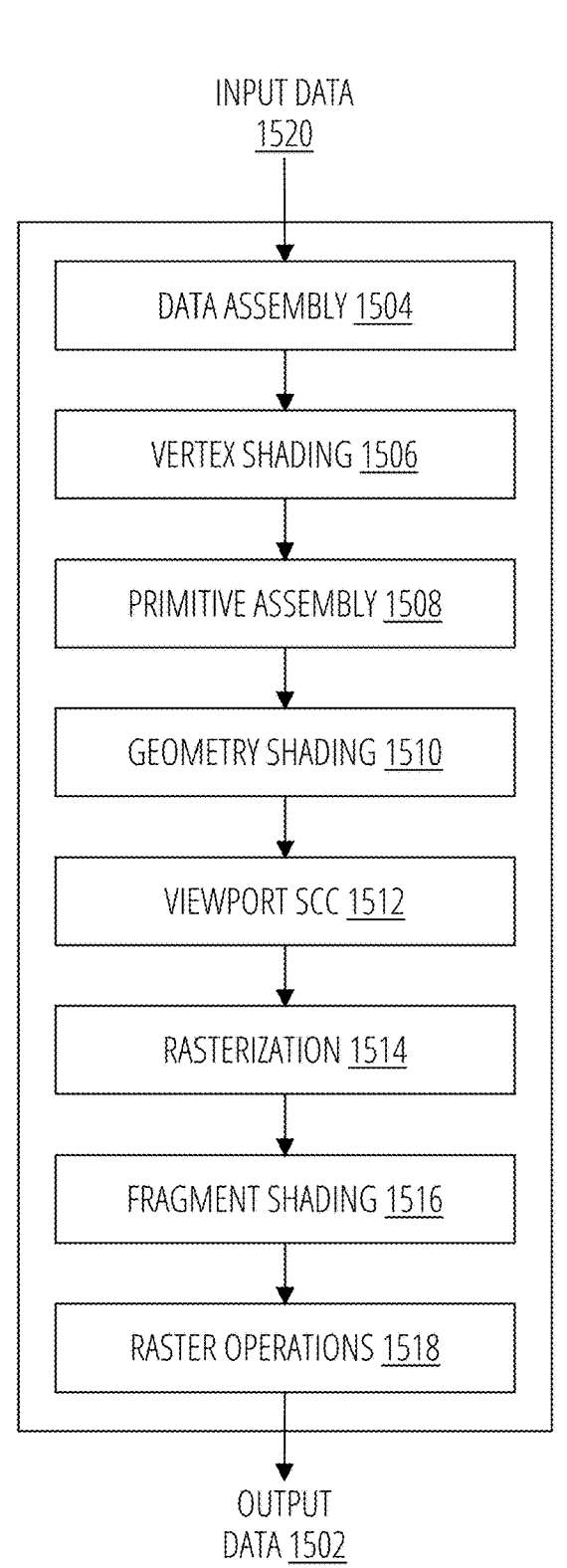
FIG. 15 depicts a graphics processing pipeline 1500 in accordance with one embodiment.

FIG. 15 is a conceptual diagram of a graphics processing pipeline 1500 implemented by the parallel processing unit 902 of FIG. 9, in accordance with an embodiment. In an embodiment, the parallel processing unit 902 comprises a graphics processing unit (GPU). The parallel processing unit 902 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 902 can be configured to process the graphics primitives to generate a frame buffer (e.g., pixel data for each of the pixels of the display).

An application writes model data for a scene (e.g., a collection of vertices and attributes) to a memory such as a system memory or memory 920. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1200 modules of the parallel processing unit 902 including one or more of a vertex shader, hull shader, domain shader, geometry shader, and a pixel shader. For example, one or more of the streaming multiprocessor 1200 modules may be configured to execute a vertex shader program that processes a number of vertices defined by the model data. In an embodiment, the different streaming multiprocessor 1200 modules may be configured to execute different shader programs concurrently. For example, a first subset of streaming multiprocessor 1200 modules may be configured to execute a vertex shader program while a second subset of streaming multiprocessor 1200 modules may be configured to execute a pixel shader program. The first subset of streaming multiprocessor 1200 modules processes vertex data to produce processed vertex data and writes the processed vertex data to the level two cache 1104 and/or the memory 920. After the processed vertex data is rasterized (e.g., transformed from three-dimensional data into two-dimensional data in screen space) to produce fragment data, the second subset of streaming multiprocessor 1200 modules executes a pixel shader to produce processed fragment data, which is then blended with other processed fragment data and written to the frame buffer in memory 920. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1500 receives input data 601 that is transmitted from one stage to the next stage of the graphics processing pipeline 1500 to generate output data 1502. In an embodiment, the graphics processing pipeline 1500 may represent a graphics processing pipeline defined by the OpenGL® API. As an option, the graphics processing pipeline 1500 may be implemented in the context of the functionality and architecture of the previous Figures and/or any subsequent Figure(s).

As shown in FIG. 15, the graphics processing pipeline 1500 comprises a pipeline architecture that includes a number of stages. The stages include, but are not limited to, a data assembly 1504 stage, a vertex shading 1506 stage, a primitive assembly 1508 stage, a geometry shading 1510 stage, a viewport SCC 1512 stage, a rasterization 1514 stage, a fragment shading 1516 stage, and a raster operations 1518 stage. In an embodiment, the input data 1520 comprises commands that configure the processing units to implement the stages of the graphics processing pipeline 1500 and geometric primitives (e.g., points, lines, triangles, quads, triangle strips or fans, etc.) to be processed by the stages. The output data 1502 may comprise pixel data (e.g., color data) that is copied into a frame buffer or other type of surface data structure in a memory.

The data assembly 1504 stage receives the input data 1520 that specifies vertex data for high-order surfaces, primitives, or the like. The data assembly 1504 stage collects the vertex data in a temporary storage or queue, such as by receiving a command from the host processor that includes a pointer to a buffer in memory and reading the vertex data from the buffer. The vertex data is then transmitted to the vertex shading 1506 stage for processing.

The vertex shading 1506 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1506 stage may manipulate individual vertex attributes such as position, color, texture coordinates, and the like. In other words, the vertex shading 1506 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1506 stage generates transformed vertex data that is transmitted to the primitive assembly 1508 stage.

The primitive assembly 1508 stage collects vertices output by the vertex shading 1506 stage and groups the vertices into geometric primitives for processing by the geometry shading 1510 stage. For example, the primitive assembly 1508 stage may be configured to group every three consecutive vertices as a geometric primitive (e.g., a triangle) for transmission to the geometry shading 1510 stage. In some embodiments, specific vertices may be reused for consecutive geometric primitives (e.g., two consecutive triangles in a triangle strip may share two vertices). The primitive assembly 1508 stage transmits geometric primitives (e.g., a collection of associated vertices) to the geometry shading 1510 stage.

The geometry shading 1510 stage processes geometric primitives by performing a set of operations (e.g., a geometry shader or program) on the geometric primitives. Tessellation operations may generate one or more geometric primitives from each geometric primitive. In other words, the geometry shading 1510 stage may subdivide each geometric primitive into a finer mesh of two or more geometric primitives for processing by the rest of the graphics processing pipeline 1500. The geometry shading 1510 stage transmits geometric primitives to the viewport SCC 1512 stage.

In an embodiment, the graphics processing pipeline 1500 may operate within a streaming multiprocessor and the vertex shading 1506 stage, the primitive assembly 1508 stage, the geometry shading 1510 stage, the fragment shading 1516 stage, and/or hardware/software associated therewith, may sequentially perform processing operations. Once the sequential processing operations are complete, in an embodiment, the viewport SCC 1512 stage may utilize the data. In an embodiment, primitive data processed by one or more of the stages in the graphics processing pipeline 1500 may be written to a cache (e.g. L1 cache, a vertex cache, etc.). In this case, in an embodiment, the viewport SCC 1512 stage may access the data in the cache. In an embodiment, the viewport SCC 1512 stage and the rasterization 1514 stage are implemented as fixed function circuitry.

The viewport SCC 1512 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1514 stage.

The rasterization 1514 stage converts the 3D geometric primitives into 2D fragments (e.g. capable of being utilized for display, etc.). The rasterization 1514 stage may be configured to utilize the vertices of the geometric primitives to setup a set of plane equations from which various attributes can be interpolated. The rasterization 1514 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1514 stage generates fragment data (e.g., interpolated vertex attributes associated with a particular sample location for each covered pixel) that are transmitted to the fragment shading 1516 stage.

The fragment shading 1516 stage processes fragment data by performing a set of operations (e.g., a fragment shader or a program) on each of the fragments. The fragment shading 1516 stage may generate pixel data (e.g., color values) for the fragment such as by performing lighting operations or sampling texture maps using interpolated texture coordinates for the fragment. The fragment shading 1516 stage generates pixel data that is transmitted to the raster operations 1518 stage.

The raster operations 1518 stage may perform various operations on the pixel data such as performing alpha tests, stencil tests, and blending the pixel data with other pixel data corresponding to other fragments associated with the pixel. When the raster operations 1518 stage has finished processing the pixel data (e.g., the output data 1502), the pixel data may be written to a render target such as a frame buffer, a color buffer, or the like.

It will be appreciated that one or more additional stages may be included in the graphics processing pipeline 1500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1510 stage). Other types of graphics processing pipelines are contemplated as being within the scope of the present disclosure. Furthermore, any of the stages of the graphics processing pipeline 1500 may be implemented by one or more dedicated hardware units within a graphics processor such as parallel processing unit 902. Other stages of the graphics processing pipeline 1500 may be implemented by programmable hardware units such as the streaming multiprocessor 1200 of the parallel processing unit 902.

The graphics processing pipeline 1500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 902. The API provides an abstraction for a programmer that lets a programmer utilize specialized graphics hardware, such as the parallel processing unit 902, to generate the graphical data without requiring the programmer to utilize the specific instruction set for the parallel processing unit 902. The application may include an API call that is routed to the device driver for the parallel processing unit 902. The device driver interprets the API call and performs various operations to respond to the API call. In some instances, the device driver may perform operations by executing instructions on the CPU. In other instances, the device driver may perform operations, at least in part, by launching operations on the parallel processing unit 902 utilizing an input/output interface between the CPU and the parallel processing unit 902. In an embodiment, the device driver is configured to implement the graphics processing pipeline 1500 utilizing the hardware of the parallel processing unit 902.

Various programs may be executed within the parallel processing unit 902 in order to implement the various stages of the graphics processing pipeline 1500. For example, the device driver may launch a kernel on the parallel processing unit 902 to perform the vertex shading 1506 stage on one streaming multiprocessor 1200 (or multiple streaming multiprocessor 1200 modules). The device driver (or the initial kernel executed by the parallel processing unit 902) may also launch other kernels on the parallel processing unit 902 to perform other stages of the graphics processing pipeline 1500, such as the geometry shading 1510 stage and the fragment shading 1516 stage. In addition, some of the stages of the graphics processing pipeline 1500 may be implemented on fixed unit hardware such as a rasterizer or a data assembler implemented within the parallel processing unit 902. It will be appreciated that results from one kernel may be processed by one or more intervening fixed function hardware units before being processed by a subsequent kernel on a streaming multiprocessor 1200.

LISTING OF DRAWING ELEMENTS 100 virtualized computing environment
102 superimposing logic
104 user
106 headset
108 imaging sensor
110 virtual object
112 virtual surface
114 physical surface
116 sensor output
202 virtual environment
204 hardware
206 user
208 virtual object
210 virtual boundary
212 application
214 operating system
302 bounding box
304 segmentation region
402 action
404 action
406 block
408 action
410 action
412 block
500 system
502 images
504 Resnet structure

506 BiGRU structure
508 attention mechanism
510 attention mechanism
512 GRU
514 GRU
602 training set
604 vision-language matching model
606 error function
700 system
702 automatic speech recognition logic
704 images
706 candidate tokens
708 max function
710 append operation
712 natural language processor
714 digital audio
716
718
800 device
802 headpiece
804 central portion
806 left optical component
808 right optical component
810 left in-coupling zone
812 right in-coupling zone
814 left intermediate zone
816 left exit zone
818 right exit zone
820 left stereo camera
822 right stereo camera
824 left microphone
826 right microphone
828 left speaker
830 right speaker
832 right intermediate zone
902 parallel processing unit
904 I/O unit
906 front-end unit
908 scheduler unit
910 work distribution unit
912 hub
914 crossbar
916 NVLink
918 interconnect
920 memory
1000 general processing cluster
1002 pipeline manager
1004 pre-raster operations unit
1006 raster engine
1008 work distribution crossbar
1010 memory management unit
1012 data processing cluster
1014 primitive engine
1016 M-pipe controller
1100 memory partition unit
1102 raster operations unit
1104 level two cache
1106 memory interface
1200 streaming multiprocessor
1202 instruction cache
1204 scheduler unit
1206 register file
1208 core
1210 special function unit
1212 load/store unit
1214 interconnect network
1216 shared memory/L1 cache

1218 dispatch
1300 processing system
1302 central processing unit
1304 switch
1306 parallel processing module
1400 exemplary processing system
1402 communications bus
1404 main memory
1406 input devices
1408 display devices
1410 network interface
1500 graphics processing pipeline
1502 output data
1504 data assembly
1506 vertex shading
1508 primitive assembly
1510 geometry shading
1512 viewport SCC
1514 rasterization
1516 fragment shading
1518 raster operations
1520 input data The foregoing description may be better understood with reference to the following terms.

Augmented reality refers to technology that superimposes computer-generated imagery on a user's view of the real world, thus providing a composite view. Virtual reality refers to the computer-generated simulation of a three-dimensional environment that can be interacted with in a seemingly real or physical way by a person using special electronic equipment, such as a headset with a display and gloves fitted with sensors. Augmented realities and virtual realities are examples of computer-generated environments. Other examples of computer-generated environments are two- and three-dimensional computer games and simulations.

The term 'engine' refers to logic to perform fixed operations on a set of inputs to generate a defined output. For example, IF (engine.logic {get.data( ), process.data( ), store.data( ),} get.data(input1)→data.input1; process.data (data.input1)→formatted.data1→store.data(formatted.data1). A characteristic of some logic engines is the utilization of models of the real data that the engine processes. Logic modules pass data to the engine, and the engine uses its data models to transform the data into a different state.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:
1. A system comprising:
a speech-to-text converter configured to generate candidate tokens for digital audio rendered in a computer-generated environment, video, or sequence of images over a time interval;
a natural language processor configured to generate one or more scores indicative of a match between the candidate tokens and a language model;
a vision-language matching model configured to generate one or more enhancements to the scores based on a match between the candidate tokens and one or more images captured from the computer-generated environment, video, or sequence of images in association with the digital audio; and
logic to generate one or more actions in or to the computer-generated environment, video, or sequence of images based on the enhanced scores and associated candidate tokens, wherein the time interval of the digital audio overlaps at least partially with a time interval of the video from which the captured images are captured.
2. The system of claim 1, wherein the vision-language matching model is configured to:
embed features of the captured images in a latent space;
embed the candidate tokens in the latent space; and
generate the enhancements to the scores of the candidate tokens based on proximity of the features of the captured images and the candidate tokens in the latent space.
3. The system of claim 1, further comprising logic to select one or more of the candidate tokens having highest enhanced scores for generation of the one or more actions.

4. The system of claim 1, wherein the time interval of the digital audio overlaps at least partially with a time interval of exposure of a user that generated the audio to an area of the computer-generated environment from which the captured images are captured.

5. The system of claim 4, wherein the captured images are captured from a perspective view of the user in the computer-generated environment.

6. The system of claim 1, wherein the digital audio is generated by a first user of the computer-generated environment, and the captured images are captured from a perspective of a second user of the computer-generated environment, and the time interval of the digital audio overlaps at least partially with a time interval of exposure of the second user to an area of the computer-generated environment from which the captured images are captured.

7. The system of claim 1, wherein the time interval of the digital audio at least partially exceeds a time interval of exposure of a user that generated the audio to an area of the computer-generated environment from which the captured images are captured.

8. The system of claim 7, wherein the captured images are captured from a perspective view of the user in the computer-generated environment.

9. The system of claim 1, wherein the digital audio is generated by a first user of the computer-generated environment, and the captured images are captured from a perspective of a second user of the computer-generated environment, and the time interval of the digital audio at least partially exceeds a time interval of exposure of the second user to an area of the computer-generated environment from which the captured images are captured.

10. A process for generating an action in or to a computer-generated environment or video, the process comprising:
  generating a candidate word or phrase for digital audio rendered in the computer-generated environment or video over a first time interval;
  computing a match score between the candidate word or phrase and a language model;
  operating a vision-language matching model to enhance the score of the word or phrase based on a latent space proximity of the candidate word or phrase and a feature embedding for an image or frame captured from the computer-generated environment or video;
  forming and executing the action in or to the computer-generated environment or video according to the enhanced score; and
  wherein the first time interval overlaps at least partially with a second time interval of exposure of a user that generated the audio to an area of the computer-generated environment from which the image or frame is captured.

11. The process of claim 10, further comprising operating the vision-language matching model to:
  embed features of the images in a latent space;
  embed the candidate word or phrase in the latent space; and
  generate the enhancements to the score of the candidate word or phrase based on proximity of the features of the images and the candidate word or phrase in the latent space.

12. The process of claim 10, further comprising:
  selecting a candidate word or phrase having a highest enhanced score for generation of the actions.

13. The process of claim 10, wherein the image is captured from a perspective view of a user in the computer-generated environment.

14. The process of claim 10, wherein the digital audio is generated by a first user of the computer-generated environment, and the image is captured from a perspective of a second user of the computer-generated environment, and the first time interval overlaps at least partially with a second time interval of exposure of the second user to an area of the computer-generated environment from which the image is captured.

15. The process of claim 10, wherein the first time interval at least partially exceeds a second time interval of exposure of a user that generated the audio to an area of the computer-generated environment from which the image is captured.

16. The process of claim 15, wherein the image is captured from a perspective view of a user in the computer-generated environment.

17. The process of claim 10, wherein the digital audio is generated by a first user of the computer-generated environment, and the image is captured from a perspective of a second user of the computer-generated environment, and the first time interval at least partially exceeds a time interval of exposure of the second user to an area of the computer-generated environment from which the image is captured.

18. The process of claim 10, wherein the first time interval overlaps at least partially with a time interval of the video from which the image is captured.

19. A non-volatile machine-readable media comprising instructions that, when applied to one or more processor of a computer system, configure the computer system to generate an action in or to a computer-generated environment or video, by:
  generating a candidate word or phrase for digital audio rendered in the computer-generated environment or video over a first time interval;
  computing a match score between the candidate word or phrase and a language model;
  operating a vision-language matching model to enhance the score of the word or phrase based on a latent space proximity of the candidate word or phrase and a feature embedding for an image or frame captured from the computer-generated environment or video;
  forming and executing the action in or to the computer-generated environment or video according to the enhanced score; and
  wherein the first time interval overlaps at least partially with a second time interval of exposure of a user that generated the audio to an area of the computer-generated environment from which the image or frame is captured.

20. A system comprising:
  a speech-to-text converter configured to generate candidate tokens for digital audio rendered in a computer-generated environment, video, or sequence of images over a time interval;
  a natural language processor configured to generate one or more scores indicative of a match between the candidate tokens and a language model;
  a vision-language matching model configured to:
    generate one or more enhancements to the scores based on a match between the candidate tokens and one or more images captured from the computer-generated environment, video, or sequence of images in association with the digital audio;

embed features of the captured images in a latent space;

embed the candidate tokens in the latent space;

generate the enhancements to the scores of the candidate tokens based on proximity of the features of the captured images and the candidate tokens in the latent space; and logic to generate one or more actions in or to the computer-generated environment, video, or sequence of images based on the enhanced scores and associated candidate tokens.

* * * * *